US006510531B1

United States Patent
Gibbons

(10) Patent No.: US 6,510,531 B1
(45) Date of Patent: Jan. 21, 2003

(54) METHODS AND SYSTEMS FOR TESTING PARALLEL QUEUES

(75) Inventor: Phillip B. Gibbons, N. Plainfield, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/401,897

(22) Filed: Sep. 23, 1999

(51) Int. Cl.[7] .................................................. G06F 11/30
(52) U.S. Cl. ............................................. 714/37; 707/7
(58) Field of Search ........................... 714/37, 38, 39, 714/42; 707/3, 4, 5, 7

(56) References Cited

U.S. PATENT DOCUMENTS 5,459,864 A * 10/1995 Brent et al. ................. 395/650
6,088,817 A *  7/2000 Haulin ......................... 714/42

* cited by examiner

Primary Examiner—Scott Baderman
(74) Attorney, Agent, or Firm—Stephen M. Gurey

(57) ABSTRACT

There is provided methods and systems for testing linearizable, linearizable priority, and non-linearizable queues. According to one embodiment of the invention, there is provided a method for verifying correct function of a linearizable queue with respect to a program executed by a plurality of processors in a computer processing system. A distinct-values trace is given that includes operations on the queue and an identifier associated with each of the operations. Each operation is associated with two timestamps respectively corresponding to a start time and an end time of the operation. The method includes the step of matching the operations to generate corresponding operation pairs, based on the identifiers. The function of the queue is identified as correct, when, for any operation pair comprising an enqueue operation e and a corresponding dequeue operation e', there does not exist another operation pair comprising an enqueue operation d and a corresponding dequeue operation d' such that an end time of the enqueue operation e precedes a start time of the enqueue operation d and an end of the dequeue operation d' precedes a start of the dequeue operation e'.

40 Claims, 8 Drawing Sheets

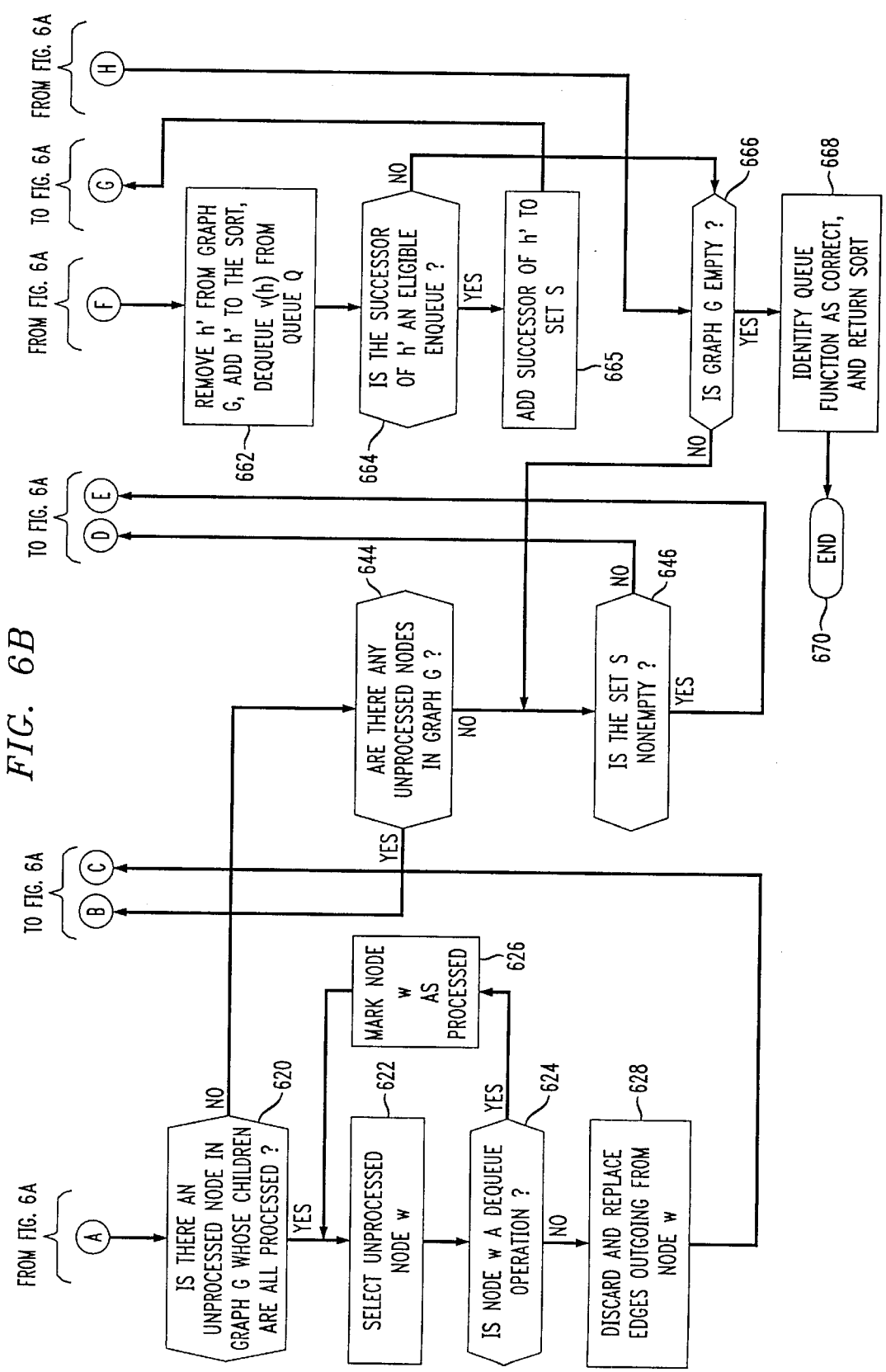

METHODS AND SYSTEMS FOR TESTING PARALLEL QUEUES

BACKGROUND

1. Technical Field

The present invention relates generally to the field data structures and, in particular to methods and systems for testing parallel queues.

2. Background Description

Operations on basic data structures/objects such as shared queues, priority queues, stacks, and counters can often dominate the execution time of a parallel program. This dominance arises due to the large number of operations on the data structure by the processors, including multiple operations contending for the shared data structure at the same time. An example would be a shared queue used to hold tasks available for execution by the processors, where multiple processors grab tasks from the head of the queue and deposit new tasks to the tail of the queue. There are considerable performance gains that arise from the development of highly-optimized, asynchronous, distributed, cache-conscious, parallel implementations of such data structures. Such implementations may employ a variety of "tricks" to reduce latencies and avoid serial bottlenecks, including servicing multiple requests simultaneously or even out-of-order. Examples include implementations based on the following: counting networks, as described by J. Aspnes, M. Herlihy, and N. Shavit, in "Counting Networks", Journal of the ACM, 41(5):1020–1048, 1994; elimination trees, as described by N. Shavit and D. Touitou, in "Elimination Trees and the Construction of Pools and Stacks", Proc. 7th ACM Symp. on Parallel Algorithms and Architectures, pp. 54–63, July 1995; diffracting trees, as described by N. Shavit, E. Upfal, and A. Zemach, in "A Steady State Analysis of Diffracting Trees", Proc. 8th ACM Symp. on Parallel Algorithms and Architectures, pp. 33–41, June 1996; or combining funnels with elimination, as described by N. Shavit and A. Zemach, in "Combining Funnels", Proc. 17th ACM Symp. on Principles of Distributed Computing, pp. 61–70, June–July 1998. In fact, the only requirement of the implementation is that it preserves the (serial) semantics of the data structure, as observed by the processors interacting with the data structure. The complexity of the implementation and the difficulty in reasoning about asynchronous parallel systems increases concerns regarding possible bugs in the implementation.

Prior testing of parallel executions has involved both distinct values and arbitrary values. For distinct values, it is guaranteed that each value inserted into a data structure is distinct. In contrast, for arbitrary values, there is no such guarantee.

Prior testing of parallel executions has also involved linearizable data objects and non-linearizable data objects. In a linearizable data object, each operation takes place over a time interval, and consists of two events, the first being the invocation of the operation by the processor, and the second being the receipt of the response (either a value or an acknowledgment) by the processor. This is described further by M. P. Herlihy and J. M. Wing, in "Linearizability: A Correctness Condition for Concurrent Objects", ACM Trans. on Programming Languages and Systems, 12(3):463–492, 1990.

For a trace to be valid for a linearizable data object, there must be a topological sort that (i) respects the order between any two events with non-overlapping intervals, and (ii) obeys the serial semantics of the data object. Thus the partial order is an interval order.

Linearizable data objects (also known as atomic objects) are well-studied (see e.g., N. Lynch, Distributed Algorithms, Morgan Kaufmann, San Francisco, Calif., chap. 13, 1996), as they have a number of desirable properties. In contrast, with non-linearizable data structures, there are no time intervals to respect. In this case, typically, the only partial order information is a total order within each processor. Thus the partial order is a union of chains (total orders), one per processor. The correctness condition does not impose any restrictions based on the real time that events occur. This correctness condition is denoted sequential consistency, and is a popular correctness condition for shared memory multiprocessors. Sequential consistency is described by L. Lamport, in "How to Make a Multiprocessor Computer that Correctly Executes Multiprocess Programs", IEEE Trans. on Computers, C-28(9):690–691, 1979. For comparison, more general non-linearizable data structures in which the partial order can be a series-parallel order (modeling some form of fork-join parallelism) or even an arbitrary partial order, were considered by J. L. Bruno, P. B. Gibbons, and S. Phillips, in "Testing Concurrent Data Structures", Technical report, AT&T Bell Laboratories, Murray Hill, N.J., December 1994.

A summary of related work in testing parallel executions will now be given. With respect to the problem of testing parallel executions of arbitrary linearizable shared data structures, a study of the same is described by J. M. Wing and C. Gong, in "Testing and Verifying Concurrent Objects", J. Parallel and Distributed Computing, 17:164–182, 1993. In the preceding article, the problem of testing arbitrary linearizable data structures is shown to be NP-complete, and an exponential time algorithm is devised. Wing and Gong also developed a simulation environment for implementing their testing algorithms.

Certification trails for testing sequential executions of balanced binary trees, priority queues, union-find structures, and mergeable priority queues have been defined and studied by G. F. Sullivan and G. M. Masson, in "Using Certification Trails to Achieve Software Fault Tolerance", Proc. 20th IEEE Fault-Tolerant Computing Symp., pp. 423–31, 1990; G. F. Sullivan and G. M. Masson, in "Certification Trails for Data Structures", Proc. 21st IEEE Fault-Tolerant Computing Symp., pp. 240–47, 1991; and J. Bright and G. Sullivan, in "Checking Mergeable Priority Queues", Proc. 24th IEEE Fault-Tolerant Computing Symp., pp. 144–53, June 1994. In this approach, the data structure code is modified to output additional information to assist in testing.

Other work on sequential testing and related issues includes: K.-H. Huang and J. Abraham, "Algorithm-based Fault Tolerance for Matrix Operations", IEEE Trans. on Computers, C-33(6):518–528, 1984; B. Dixon, M. Rauch, and R. E. Tarjan, "Verification and Sensitivity Analysis of Minimum Spanning Trees in Linear Time", SIAM Journal on Computing, 21(6):1184–1192, 1992; and P. Ramanan, "Testing the Optimality of Alphabetic Trees", Theoretical Computer Science, 93:279–302, 1992.

Note that unlike testing sequential executions, testing parallel executions focuses on topological sorting since it does not assume a centralized serialization point or a central module implementing the data structure. This serialization point or central module is undesirable since it imposes a serial bottleneck in the parallel program. The sequential trace work, in contrast, focuses on testing procedures that are more efficient in time and/or space than the implementation being tested. These are also the concerns of the works on sequential program checking, such as those described by, for example: M. Blum and S. Kannan, "Designing Programs that Check Their Work", Proc. 21$^{st}$ ACM Symp on Theory of Computing, pp. 86–97, May 1989; M. Blum, M. Luby, and R. Rubinfeld, in "Self-testing/correcting with Applications to Numerical Problems", Proc. 22$^{nd}$ ACM Symp. on Theory of Computing, pp. 73–83, May 1990; and M. Blum, W. Evans, P. Gemmell, S. Kannan, and M. Naor, in "Checking the Correctness of Memories", Algorithmica, 12(2/3):225–244, 1994.

In a recent independent work, algorithms for checking sequential priority queues were presented by U. Finkler and K. Mehlhorn, in "Checking Priority Queues", Proc. 10$^{th}$ ACM-SIAM Symp. on Discrete Algorithms, pp. S901–02, January 1999. Their algorithms observe the sequential stream of operations at the data structure, and check to see if this stream is legal.

Testing the serializability of database transactions has been proven to be NP-complete by C. Papadimitriou, in "The Theory of Database Concurrency Control", Computer Science Press, 1986. Testing a shared memory for sequential consistency or linearizability under a range of scenarios has been studied by P. B. Gibbons and E. Korach, in "Testing Shared Memories", SIAM Journal on Computing, 26(4):1208–1244, 1997.

Other work on testing and related issues for parallel machines includes: P. Banerjee and J. A. Abraham, "Bounds on Algorithm-based Fault Tolerance in Multiple Processor Systems", IEEE Trans. on Computers, C-35(4):296–306, 1986; V. Balasubramanian and P. Banerjee, "Compiler-assisted Synthesis of Algorithm-based Checking in Multiprocessors", IEEE Trans. on Computers, C-39(4):436–459, 1990; P. Banerjee, J. T. Rahmeh, C. Stunkel, V. S. Mair, K. Roy, V. Balasubramanian, and J. A. Abraham, "Algorithm-based Fault Tolerance on a Hypercube Multiprocessor", IEEE Trans. on Computers, C-39(9):1132–1245, 1990; Y. Afek, D. S. Greenberg, M. Merritt, and G. Taubenfeld, "Computing with Faulty Shared Memory", Proc. 11$^{th}$ ACM Symp. on Principles of Distributed Computing, pp. 47–58, August 1992; and J. L. Bruno and E. C. Coffman, Jr., "Optimal Fault-tolerant Computing on Two Parallel Processors", Technical report, AT&T Bell Laboratories, Murray Hill N.J., October 1994.

In addition, J. L. Bruno, P. B. Gibbons, and S. Phillips, in "Testing Concurrent Data Structures", Technical report, AT&T Bell Laboratories, Murray Hill, N.J., December 1994, presented an $O(n^3)$ time algorithm for testing parallel queues and priority queues, wherein n is the length of the trace. However, that algorithm is too slow for large n.

In summary, the prior art methods cannot be used for fast testing of parallel queues; the methods either do not apply to queues, apply only to sequential queues or parallel queues implemented with a serial bottleneck, require modification of the implementation code, and/or are too slow (e.g., $O(n^3)$ running time or worse).

Thus, it would be desirable and highly advantageous to have methods and systems for testing parallel queues that overcome the above mentioned deficiencies in the prior art methods and systems.

SUMMARY OF THE INVENTION

The present invention is directed to methods and systems for testing parallel queues. In particular, the present invention provides an $O(n)$ time method/system for testing linearizable FIFO queues, an $O(n \log n)$ time method/system for testing linearizable priority queues, and an $O(np^2)$ time method/system for testing non-linearizable FIFO queues, where n is the number of enqueue or dequeue operations and p is the number of processors. The methods consider testing in the context of a single run of the program. This has the advantage of testing an actual run of the implementation under real conditions, not an abstraction.

According to a first aspect of the present invention, and with respect to a computer processing system comprising a linearizable queue and a plurality of processors, there is provided a method for verifying correct function of the queue with respect to a program executed by the processors. A distinct-values trace is given that includes the operations on the queue and an identifier associated with each of the operations. Each operation is associated with two timestamps respectively corresponding to a start time and an end time of the operation. The method includes the step of sorting the timestamps in ascending or descending order and placing the timestamps in an array A. The operations are matched to generate corresponding operation pairs, based on the identifiers. Each element of an array B is populated, such that B[i], the ith element of the array B, is equal to a start time of an enqueue operation of a given operation pair when A[i], the ith element of array A, is equal to an end time of a dequeue operation of the given operation pair, and such that B[i] is equal to zero when A[i] is not equal to the end time of the dequeue operation of the given operation pair. Similarly, each element of an array C is populated such that C[i], the ith element of array C, is equal to a maximum value corresponding to all values in the array B from one to i when the sorting is ascending, and from i to an end value in the array B when the sorting is descending. The function of the queue is identified as correct, when there does not exist i such that A[i] is equal to a start time of a dequeue operation of a respective operation pair and an end time of an enqueue operation of the respective operation pair is less than C[i].

According to a second aspect of the present invention, the method further includes the step of, upon performing the matching step, identifying the function of the queue as incorrect when there exists one of an unpaired operation and an operation pair such that a dequeue operation of the pair ends before an enqueue operation of the pair begins.

According to a third aspect of the present invention, the method further includes the step of identifying the function of the queue as incorrect, when there exists i such that A[i] is equal to a start time of the dequeue operation of the respective operation pair and the end time of the enqueue operation of the respective operation pair is less than C[i].

According to a fourth aspect of the present invention, and with respect to a computer processing system comprising a linearizable priority queue and a plurality of processors, wherein the queue supports insert and deletemax operations, there is provided a method for verifying correct function of the queue with respect to a program executed by the processors. A distinct-values trace is given that includes the operations on the queue and an identifier associated with each of the operations. Each operation is associated with two timestamps respectively corresponding to a start time and an end time of the operation. The method includes the step of sorting the timestamps in ascending or descending order and placing the timestamps in an array A. The operations are matched to generate corresponding operation pairs, based on the identifiers. For all i, in ascending order when the sorting is ascending, in descending order when the sorting is descending, starting with a set being initially empty, a value associated with a given operation pair is inserted into the set when A[i] is equal to an end time of an enqueue operation of the given operation pair that precedes a start time of a dequeue operation of the given operation pair, and the value associated with the given operation is deleted from the set when A[i] is equal to the start time of the dequeue of the given operation pair that succeeds the end time of the enqueue operation of the given operation pair. For each i, an array B[i] is populated with a maximum value in the set upon processing A[i]. The function of the queue is identified as correct, when there does not exist a respective operation pair such that a minimum value in the array B in an entire range max (a start time of an enqueue operation of the respective operation pair, a start time of a dequeue operation of the respective operation pair) to an end time of the dequeue operation of the respective operation pair is greater than the value associated with the given operation pair.

According to a fifth aspect of the present invention, the method further includes the step of, upon performing the matching step, identifying the function of the queue as incorrect when there exists one of an unpaired operation and an operation pair such that a dequeue operation of the pair ends before an enqueue operation of the pair begins.

According to a sixth aspect of the present invention, the method further includes the step of identifying the function of the queue as incorrect, when there exists the respective operation pair such that the minimum value in the array B in the entire range max (the start time of the enqueue operation of the respective operation pair, the start time of the dequeue operation of the respective operation pair) to the end time of the dequeue operation of the respective operation pair is greater than the value associated with the given operation pair.

These and other aspects, features and advantages of the present invention will become apparent from the following detailed description of preferred embodiments, which is to be read in connection with the accompanying drawings.

BRIEF DESCRIPTION OF THE DRAWINGS

FIGS. 6A and 6B are a block/flow chart of a system/method for verifying correct function of a non-linearizable queue with respect to a program executed by a plurality of processors according to an embodiment of the present invention.

DETAILED DESCRIPTION OF PREFERRED EMBODIMENTS

Figure 1:
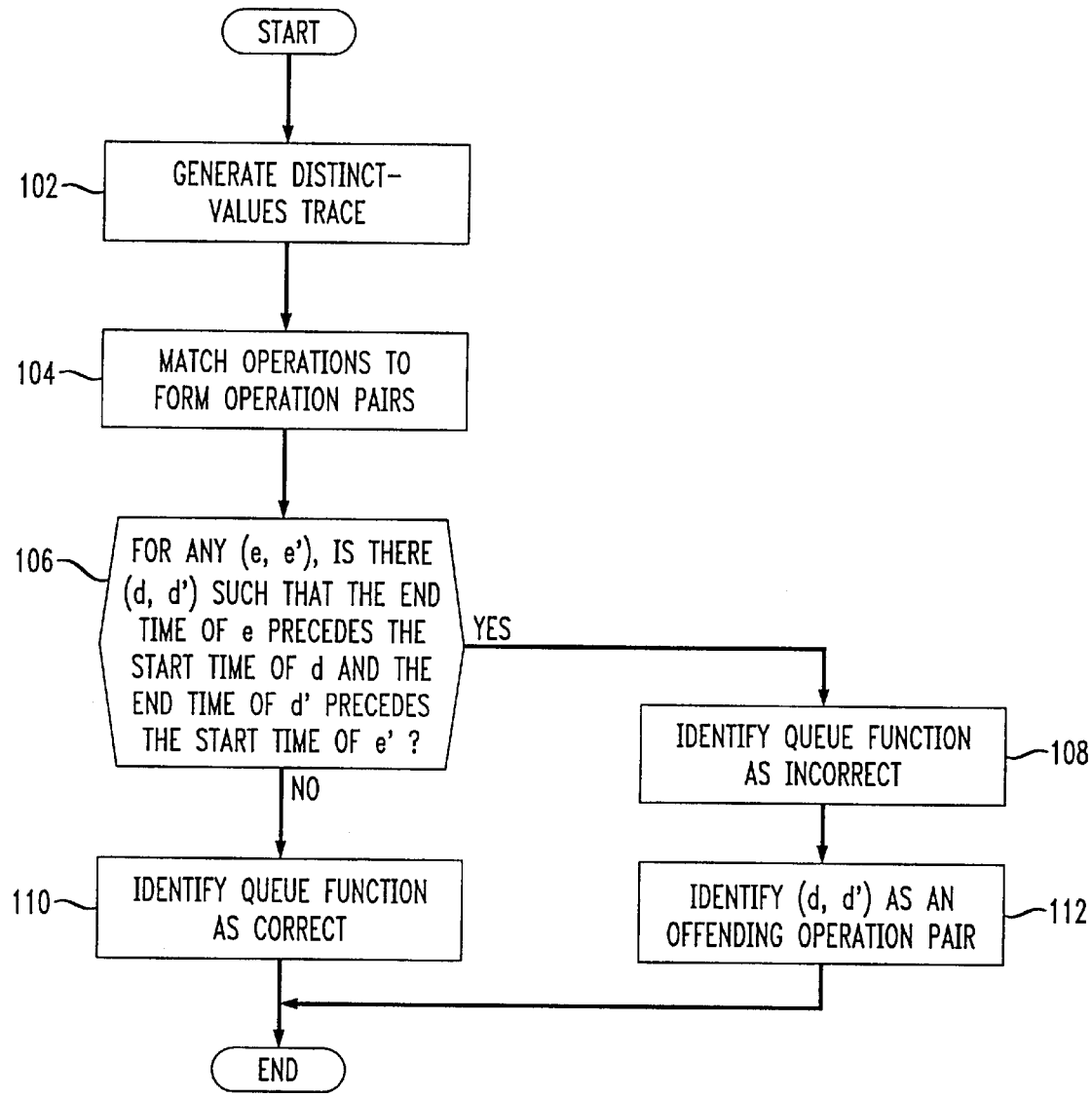
FIG. 1 is a block/flow chart of a system/method for verifying correct function of a linearizable queue with respect to a program executed by a plurality of processors according to an embodiment of the present invention.

The present invention is directed to a methods for testing parallel queues. In particular, the present invention provides "black box" procedures for testing whether a parallel data structure behaved correctly in an execution of a parallel program. Black box testing procedures rely solely on the outcomes of the data structure operations, as recorded at the individual processors requesting the operations. Since they are external to the implementation, they work-for any implementation, and do not interfere with the implementation (such interference can mask possible timing-dependent errors). It is to be appreciated that the methods described herein may cease operation upon detecting a first error indicating incorrect function of the queue under test, or they may continue operation until all errors are detected.

A trace is recorded for each processor of its operations on the shared data structure over the course of a program execution, and then a post-execution/post-mortem audit is performed of the per-processor traces. This audit either detects one or more errors in the implementation or validates the correctness of the execution by determining that there is a merging of the per-processor traces (i.e., a topological sort of the operations in these traces) that preserves the (serial) semantics of the data structure/object. It is to be appreciated that, the traces may be either distinct-values traces or non-distinct-values traces. However, the use of distinct-values traces is preferred.

Consider the example depicted in TABLE 1 of per-processor traces for two executions of a program with three processors, $p_1$, $p_2$ and $p_3$, accessing a shared first-in-first-out (FIFO) queue. Arrows indicate the operation order at the individual processors, so for example in both executions, processor $p_1$, enqueues 2, then enqueues 3, then enqueues 1.

TABLE 1

Valid vs. invalid queue traces.

| $P_1$ | $P_2$ | $P_3$ | $P_1$ | $P_2$ | $P_3$ |
|---|---|---|---|---|---|
| En-queue(2) ↓ | De-queue(2) ↓ | De-queue(3) ↓ | En-queue(2) ↓ | De-queue(2) ↓ | De-queue(5) ↓ |
| En-queue(3) ↓ | De-queue(1) ↓ | De-queue(5) | En-queue(3) ↓ | De-queue(1) ↓ | De-queue(3) |
| En-queue(1) | En-queue(5) | | En-queue(1) | En-queue(5) | |

The per-processor traces on the left correspond to a valid execution of the shared queue: the traces can be merged to give, for example, the total order Enqueue(2), Enqueue(3), Dequeue(2), Enqueue(1), Dequeue(3), Dequeue(1), Enqueue(5), and Dequeue(5). The per-processor traces on the right, however, are invalid, because there is no possible merging of the traces such that each dequeue operation involves the first value currently in the queue. Such an execution could occur in a buggy shared queue implementation in which processor $p_3$ issues its two enqueue requests, and the second request bypasses the first (e.g., in the interconnection network).

The general combinatorial problem considered is the following. Each operation on the data structure is represented as a (processor ID, operation description) pair, e.g.

(P3, Pop(5)). We are given a trace comprising a set of operation pairs and a partial order on these pairs that reflects ordering constraints that must be preserved, e.g., in TABLE 1, the operations by the same processor were ordered in program order for that processor. The goal is to determine if there is a topological sort of the operations (i.e., a total order that is consistent with the given partial order) such that the sorted sequence of operations is a legal serial execution of the data structure, in order to distinguish valid executions from invalid executions.

It is to be understood that the present invention may be implemented in various forms of hardware, software, firmware, special purpose processors, or a combination thereof. Preferably, the present invention is implemented in software as an application program tangibly embodied on a program storage device. The application program may be uploaded to, and executed by, a machine comprising any suitable architecture. Preferably, the machine is implemented on a computer platform having hardware such as one or more central processing units (CPU), a random access memory (RAM), and input/output (I/O) interface(s). The computer platform also includes an operating system and microinstruction code. The various processes and functions described herein may either be part of the microinstruction code or part of the application program (or a combination thereof) which is executed via the operating system. In addition, various other peripheral devices may be connected to the computer platform such as an additional data storage device and a printing device.

It is to be further understood that, because some of the constituent system components and method steps depicted in the accompanying Figures are preferably implemented in software, the actual connections between the system components (or the process steps) may differ depending upon the manner in which the present invention is programmed. Moreover, because some of the constituent system components and method steps depicted in the accompanying Figures may be implemented in both hardware and software, items bearing the same reference numeral may be referred to in manner indicative of both hardware and software. Given the teachings herein, one of ordinary skill in the related art will be able to contemplate these and similar implementations or configurations of the present invention.

To facilitate a clear understanding of the present invention, definitions of terms employed herein will now be given. "Data structure" and "data object" are used interchangeably to represent items such as, for example, queues, priority queues, stacks, counters, and so forth. Moreover, the terms "operation" and "event" are also used interchangeably herein.

A parallel program is any program for a collection of processors (i.e., more than one). A run of a parallel program defines a history of operations on a shared data structure. This history is represented by a quadruple $(U, <, \pi, op)$, called a trace. U is a finite set of elements called events, and < is a partial order over U. In particular, $\alpha<\beta$ whenever we know that $\alpha$ happened before $\beta$. Processor ids and operations are associated with events by the functions $\pi$ and op,respectively, with domain U. For simplicity in reporting running times, it is presumed that all values, timestamps, and so forth are integers. Extensions to handle non-integers are straightforward and, thus, may be readily implemented by one of ordinary skill in the related art. It is to be noted that such extension affect only the running times.

An event sequence $\sigma = \alpha_1, \ldots, \alpha_k$ is a sequence of distinct events from U. If a is an event sequence then $\{\sigma\}$ denotes the set of elements in $\sigma$, and $<_o$ is the total order on U where $\alpha_i <_o \alpha_j$ if i<j. A topological sort of the trace $(U,<,\pi,op)$ is an event sequence a such that $\{\sigma\}=U$ and for all $\alpha, \beta \in U$, $\alpha<\beta$ implies $\alpha<_o\beta$.

The "correctness" of a trace depends on the serial semantics of the data structure. Accordingly, a trace is considered valid if the semantics of the data object are preserved, i.e. there is a topological sort of the trace that is a legal serial execution for the data object. For simplicity in exposition, we require that in order for a trace with insert and delete events (e.g., push and pop for a stack, enqueue and dequeue for a queue) to be valid, there must be a 1-1 correspondence between insert and delete events. Extensions to handle insert events appearing without corresponding delete events are straightforward and, thus, are readily implemented by one of ordinary skill in the related art. As an example of a valid trace, consider a first-in-first-out (FIFO) queue. A trace for a FIFO queue is valid if there exists a topological sort $\sigma$ and a 1-1 correspondence between enqueue events and dequeue events with the same value such that: (i) for each corresponding pair, the enqueue appears before the dequeue in $\sigma$; and (ii) an enqueue event a appears before an enqueue event b in $\sigma$ if the dequeue event a' corresponding to a appears before the dequeue event b' corresponding to b in $\sigma$.

We say that a pair of events, (e, e'), is an event pair if op(e)=insert (x) and op(e')=delete (x) for the same value x. Thus, only event pairs can be corresponding events.

A distinct-values trace is a trace $(U,<,\pi,op)$ in which every event in U appears in, at most, one event pair. As is shown hereinbelow, testing parallel executions of distinct-values traces is easier than testing parallel executions of traces with arbitrary values since there is no ambiguity in the target 1-1 correspondence between insert and delete events. It is to be noted that processor may be used herein as a synonym for process.

The testing of linearizable queues according to an embodiment of the present invention will now be described. Let $(U,<,\pi,op)$ be a distinct-values trace where the parallel data structure is a FIFO linearizable queue. The operations are either enqueue (x) or dequeue (x) for an integer x. Two events $\alpha, \beta \in U$ are event pairs if $\alpha$ is an enqueue (x) operation and $\beta$ is a dequeue (x) operation (or vice-versa) for the same value x. The partial order < is an interval order. Associated with each event $\alpha$ is an interval $[t_1,t_2]$ where $t_1$ and $t_2$ are integral timestamps with $t_1<t_2$. These timestamps are denoted as [$\alpha$ and ]$\alpha$, respectively. Thus, for a given event pair (e, e'), wherein e is an enqueue and e' is a dequeue, [e represents the start time of the enqueue, ]e represents the end of the enqueue, [e' represents the start time of the dequeue, and ]e' represents the end of the dequeue. It is presumed that no two events in U have any timestamps in common (to ensure this across all processors, we can break ties using $\pi$). The event intervals implicitly define the partial order <: $\alpha<\beta$ if an only if ]$\alpha$<[$\beta$. We say $\alpha$ is active at t if [$\alpha \leq t \leq$ ]$\alpha$. That is, t is considered to be active if t occurs at either the start time or the end of an enqueue operation $\alpha$ or any time therebetween. While the preceding example employed an enqueue operation, a dequeue operation is also subject to the same.

We seek a topological sort of $(U, <, \pi, op)$ which preserves the serial semantics of a FIFO queue. Accordingly, we define a queue sort of a distinct-values trace $((U, <, \pi, op)$ to be a topological sort $\sigma$ of $(U, <, \pi, op)$ such that for all event pairs (a, a') $a<_{94}$ a', and for all other event pairs (b,b'), we have $a<_o b$ if $a'<_o b'$. The following algorithm (Algorithm A) determines whether or not there exists a queue sort, in linear time.

Given a distinct-value trace for a (possibly buggy) linearizable FIFO queue, Algorithm A determines whether there exists a queue sort a of the trace. Algorithm A includes the following steps:

1. Sort the timestamps in the trace in ascending order and place the sorted timestamps in an array A.
2. Match up event pairs. If there exists either an event that is not in an event pair or an event pair (e,e') such that ]e'<[e (i.e., the dequeue event ends before the enqueue event begins), return NO.
3. For all i, if A[i]=]e' then B[i]:=[e, where (e,e') is an event pair, and otherwise, B[i]:=0.
4. Compute the prefix max of B: For all i, let $C[i] := \max_{1 \leq j \leq i} B[j]$.
5. If there exists i such that A[i]=[e' and ]e<C[i], where (e,e') is an event pair, return NO. Otherwise, return YES.

Given a distinct-values trace with n events, Algorithm A runs in O(n) time and returns YES if there exists a queue sort of the trace. A proof for the preceding statement follows. The time complexity is immediate, since integer sorting can be used in step 1. It is also immediate that if step 2 returns NO, there can be no queue sort. The semantics of a queue require that in σ, a value v is enqueued before a value w if v is dequeue before w. Thus for any event pair (e,e'), if there exists an event pair (d,d') such that ]e<[d and ]d'<[e', then $e <_\sigma d$ and $d' <_\sigma e'$, contradicting σ being a valid queue sort. Equivalently, if for any event pair (e,e'), we consider all event pairs (d,d') such that ]d'<[e' and then take the maximum [d among them, there is no queue sort if ]e<[d. It follows that if step 5 returns NO, there can be no queue sort.

In showing that a queue sort exists when step 5 returns a YES, we will first define a graph G representing a subset of the constraints implied by the traces. We then show that a "greedy" schedule of G that favors enqueues over dequeues can be used to produce a valid queue sort, as long as G is acyclic. Finally, we show that G is acyclic unless it contains an "anti-time partner" edge, precisely of the type checked for in step 5.

Consider a graph G where each event in U is a node and there is an edge from node α to node β, i.e., if ]α<[β. Denote these edges as "time" edges. Next, for each pair of event pairs (d,d') and (e,e') such that ]d'<[e', if there is no time edge from node d to node e, then let G have an edge from d to e, denoted a "partner" edge. Note that partner edges are only between enqueue events.

Consider the following greedy schedule. At each step of the schedule, we say an event in G is eligible if it is unscheduled and all its predecessors in G have been scheduled. Note that each event α can be scheduled no earlier than [α and no later than ]α. Repeat until all events are scheduled: Schedule an eligible enqueue, adding its value to the tail of the queue. If none, schedule the eligible dequeue for the value that is presently at the head of the queue.

Note that if the greedy schedule succeeds in scheduling all the events in G, then it produces a valid queue sort. This is because it only schedules eligible events (and hence all time constraints are satisfied) and it only schedules dequeues that correspond to the current head of the queue.

Next, it will be shown that if there are no cycles in G then the greedy schedule succeeds. Suppose to the contrary that it does not succeed, and consider the first timestamp t such that t=]α for an unscheduled event α and there are no eligible enqueues and no dequeue for a value that is presently at the head of the queue. Then all events β such that ]β<t have been successfully scheduled. Thus there are no time edges preventing α (or any other unscheduled event φ such that [φ<t) from being eligible. Suppose α is an enqueue e. Consider the subgraph, H, of unscheduled ancestors of e. No time edges are in H and any partner edges are between enqueues. Thus since there are no cycles in G, there must be at least one enqueue in H that has no incoming edges and hence is eligible, which is a contradiction. So suppose instead that α is a dequeue d' and let (d,d') be an event pair. Since by step 2 we know that [d<t, there are no time edges into d. Suppose d is not scheduled, and let H be the subgraph of G comprising the unscheduled ancestors of d. Then as before, there must be an eligible enqueue in H, which is a contradiction. So d is scheduled. Let (a,a') be the event pair such v(a) is presently at the head of the queue. By assumption, d≠a and a' is not eligible, although a has been scheduled. Furthermore, a was scheduled before d. If [a'>t then ]d'<[a', so G would have a partner edge from d to a, contradicting a being eligible for scheduling before d. Otherwise, [a'<t and let H be the subgraph G comprising the unscheduled ancestors of a'. There are no time edges in H and partner edges are only between enqueues, so a', the only node in H, is eligible, which is a contradiction. Thus the greedy schedule succeeds if there are no cycles in G.

In showing that there are no cycles in G, first suppose to the contrary that there exists a cycle C in G. Then, since time edges are transitive, partner edges correspond to time edges among dequeues and hence are also transitive, and there can be no cycles of only time edges either among the enqueues or the dequeues, it follows that there also exists a cycle C' such that time edges and partner edges alternate. Thus C' has at least one time edge and at least one partner edge. Since partner edges are only among enqueues, no dequeue can be part of any cycle that alternates time edges and partner edges. Thus C' has only enqueues. Let S be the set of enqueues e in C' with an incoming time edge. Let r∈S be such that ]r'≦]x' for all x∈S, where (r,r') and (x,x') are event pairs. Let q be the predecessor of r in C' (by a time edge), and let p be the predecessor of q (by a partner edge). Since the cycle alternates, we have that p∈S. Let (p,p') and (q,q') be event pairs. The partner edge from p to g implies that ]p'<[q', and hence by the definition of r, ]r'<[q'. Thus G has a partner edge from r to q that forms a two-cycle with the time edge from q to r; we denote this an "anti-time partner" edge. Since step 5 returned YES, there are no events resulting in anti-time partner edges in G, which is a contradiction. Thus, there are no cycles in G.

Therefore, Algorithm A returns YES if there exists a queue sort of the trace.

Note that to maintain linear time, algorithm A did not materialize the edges in G. In fact, it can be shown that even a transitive reduction of the edges in G can still have Θ(np) edges, using an example similar to that considered hereinbelow with respect to testing sequentially consistent queues.

Figure 2:
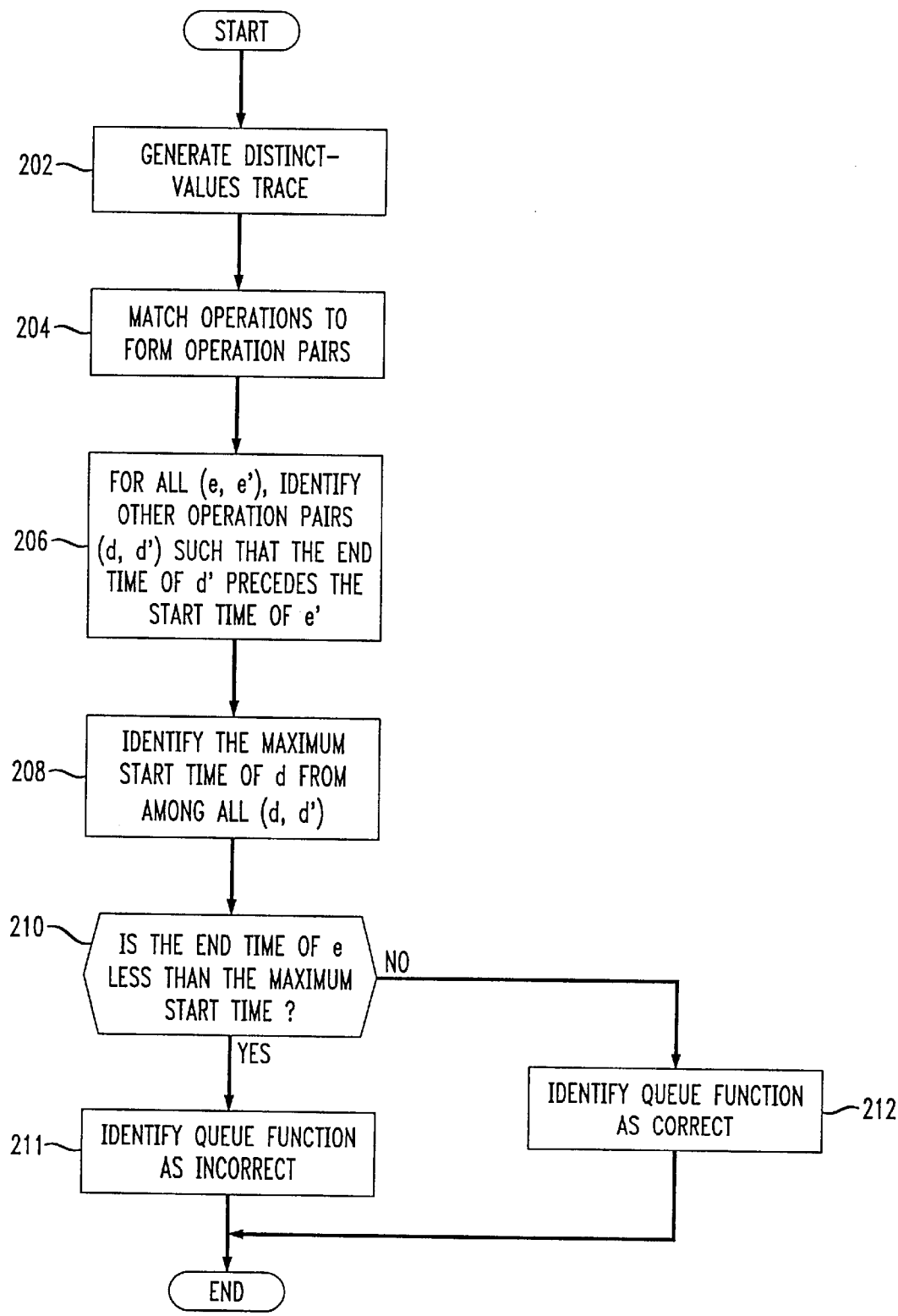
FIG. 2 is a block/flow chart of a system/method for verifying correct function of a linearizable queue with respect to a program executed by a plurality of processors according to another embodiment of the present invention.
Figure 3:
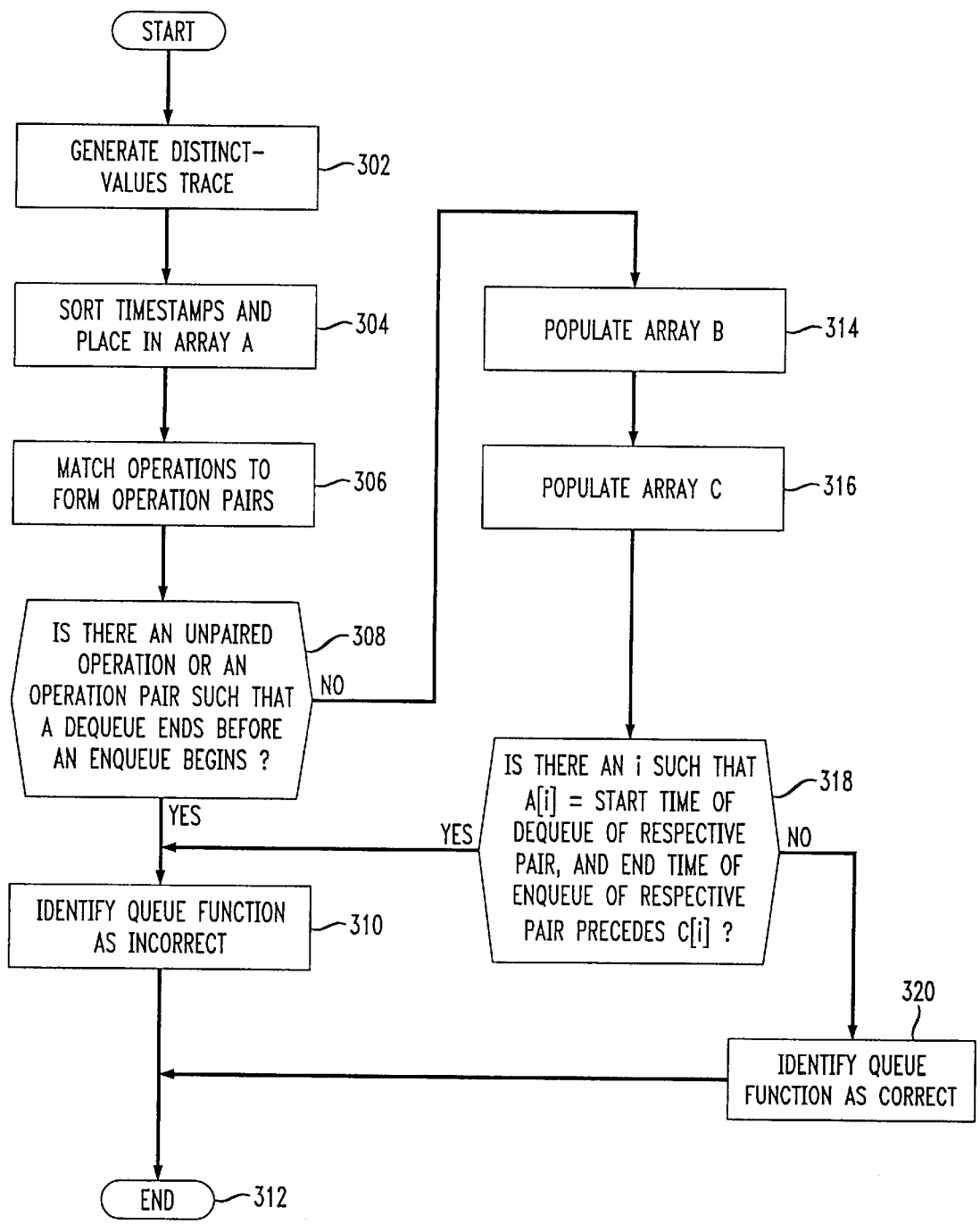
FIG. 3 is a block/flow chart of a system/method for E verifying correct function of a linearizable queue with respect to a program executed by a plurality of processors according to yet another embodiment of the present invention.

With respect to a computer processing system that includes a linearizable queue and a plurality of processors, FIGS. 1, 2, and 3 are block/flow charts of systems/methods for verifying correct function of the queue with respect to a program executed by the processors according to various embodiments of the present invention. The systems/methods of FIGS. 1, 2, and 3 correspond to Algorithm A given above.

The system/method of FIG. 1 includes generating a distinct-values trace of operations on the queue (block 102). The trace includes the operations and an identifier associated with each of the operations, wherein each operation has two timestamps associated therewith respectively corresponding to a start time and an end time of the operation.

The operations are matched to generate corresponding operation pairs, based on the identifiers (block 104). It is then determined whether, for any operation pair including an enqueue operation e and a corresponding dequeue operation e', there exists another operation pair that includes an enqueue operation d and a corresponding dequeue operation d' such that an end time of the enqueue operation e precedes a start time of the enqueue operation d and an end of the dequeue operation a' precedes a start time of the dequeue operation e' (block 106). If so, then the function of the queue is identified as incorrect (block 108) and the other operation pair (d, d') is identified as an offending pair for the pair (e, e') (block 112). Otherwise, the function of the queue is identified as correct (block 110).

The system/method of FIG. 2 includes generating a distinct-values trace of operations on the queue (block 202). The trace includes the operations and an identifier associated with each of the operations, wherein each operation has two timestamps associated therewith respectively corresponding to a start time and an end time of the operation.

The operations are matched to generate corresponding operation pairs, based on the identifiers (block 204). Then, for all operation pairs comprising an enqueue operation e and a corresponding dequeue operation e', other operation pairs are identified that include an enqueue operation d and a corresponding dequeue operation d' such that an end of the dequeue operation d' precedes a start time of the dequeue operation e' (block 206).

The maximum start time of the enqueue operation d from among all the identified, other operation pairs is determined (block 208). It is then determined whether the end time of the enqueue operation e is less than the maximum start time (block 210). If so, then the function of the queue is identified as incorrect (block 211). Otherwise, the function of the queue is identified as correct (block 212).

The system/method of FIG. 3 includes generating a distinct-values trace of operations on the queue (block 302). The trace includes the operations and an identifier associated with each of the operations, wherein each operation has two timestamps associated therewith respectively corresponding to a start time and an end time of the operation.

The timestamps are sorted in either ascending or descending order, and the sorted timestamps are placed in an array A (block 304). The operations are matched to generate corresponding operation pairs, based on the identifiers (block 306). It is then determined whether there exists an unpaired operation or an operation pair such that a dequeue operation of the pair ends before an enqueue operation of the pair begins (block 308). If so, then the function of the queue is identified as incorrect (block 310), and the system/method is terminated (block 312). Otherwise, the system/method proceeds to block 314.

At block 314, for all i, an array B is populated such that B[i] is equal to the start time of an enqueue operation of a given operation pair, when A[i] is equal to the end time of a dequeue operation of the given operation pair. For all i, the array B is populated such that B[i] is equal to zero, when A[i] is not equal to the end time of the dequeue operation of the given operation pair.

For all i, an array C is populated such that C[i] is equal to the maximum value corresponding to all values in the array B from one to i when the sorting is ascending, and from i to an end value in the array B when the sorting is descending (block 316). It is then determined whether there exists i such that A[i] is equal to the start time of a dequeue operation of a respective operation pair and the end time of an enqueue operation of the respective operation pair is less than C[i] (block 318). If so, then the system/method returns to block 110 to identify the function of the queue as incorrect. Otherwise, the function of the queue is identified as correct (block 320).

The testing of linearizable priority queues according to an embodiment of the present invention will now be described. Let $(U, <, \pi, op)$ be a distinct-values trace where the parallel data structure is a linearizable priority queue supporting insert and deletemax operations (alternatively, deletemin operations can be supported), and $v(\alpha)$ is the component of $op(\alpha)$ corresponding to the value inserted into the queue by event $\alpha \in U$. A priority-queue sort of a distinct-values trace $(U, <, \pi, op)$ is a topological sort $\sigma$ of $(U, <, \pi, op)$ such that for all event pairs (a,a'), $a <_\sigma a'$ and for all other event pairs (b,b'), if $v(a)>v(b)$ and $b'<_\sigma a'$ then $b'<_\sigma a$.

Priority queues raise additional complications over queues. For a priority queue, if (e,e') and (f,f') are both event pairs, then $v(e)<v(f)$ implies either $f'<_\sigma e'$ or $e'<_\sigma f$. The difficulty in extending Algorithm A and its correctness proof is that partner edges now go from dequeues to enqueues, so we can no longer argue that the partner ancestors of an unscheduled enqueue are all enqueues and hence some enqueue must be eligible. Instead, a new approach is employed. We observe that for each event pair (e,e'), if ]e<[e' then v(e) must be in the queue at least from time ]e to time [e', and hence a lower bound on the maximum value in the queue at time t can be determined by computing the maximum v(e) such that ]e≦t<[e'. We denote this lower bound over all timestamps as the minmax skyline. Then for any event pair (f,f'), f' cannot be scheduled during any time for which v(f) is less than the minmax skyline (since it could never be the max in the queue at that time). We show below that for a valid priority-queue sort, the necessary condition that there exists a t between [f' and ]f' such that the minmax skyline is at most v(f), is also a sufficient condition.

As an example, consider the following trace, sorted by timestamp, and its minmax skyline, where $v(a)<v(b)<v(c)$:
trace: [a [b [c ]b [h [h' ]a [b' ]c [a' ]h ]h' [c' ]a' ]c' ]b'
skyline: 0 0 0 v(b) v(b) v(b) v(b) v(a) v(c) v(c) v(c) v(c) 0 0 0 0

If v(h)<v(a) in the trace, then there is no valid priority-queue sort (the minmax skyline is greater than v(h) throughout the range from [h' to ]h'). Otherwise, v(h)>v(a) and b, a, b', h, h', c, c', a' is a valid priority-queue sort.

Given a distinct-value trace for a (possibly buggy) linearizable priority queue, Algorithm B determines whether there exists a priority-queue sort σ of the trace. Algorithm B includes the following steps:

1. Sort the timestamps in the trace and place in an array A.
2. Match up event pairs. If there exists either an event that is not in an event pair or an event pair (e,e') such that ]e'<[e, return NO.
3. Compute the minmax skyline B: Scan through A in order, starting with an initially empty set. For each A[i], insert v(e) into the set if A[i]=]e<[e' and delete v(e) if A[i]=[e'>]e, where (e,e') are an event pair. Let B[i]:=the maximum value in the set after processing A[i].
4. Preprocess B for range minima queries.
5. If there exists an event pair (e,e') such that the minimum value in B in the entire range max ([e,[e') to ]e' is greater than v(e), return NO. Otherwise, return YES.

The set referred to in step 3 of algorithm B is preferably implemented as a sequential priority queue. However, it is to be appreciated that the set may be implemented in other types of queues other than a sequential priority queue.

Given a distinct-values trace with n events, Algorithm B runs in O(n log n) time and returns YES if there exists a priority-queue sort of the trace. A proof for the preceding statement follows. Clearly, if step 2 returns NO, there is no valid priority-queue sort. Likewise, in step 5, since e' can be scheduled no earlier than e, then it must be scheduled in the given range. Thus, as described above, if step 5 returns NO, then there is no valid priority-queue sort. On the other hand, if step 5 returns YES, then consider the following scheduling algorithm: Schedule each dequeue e' at the smallest t≧max ([e, [e') such that v(e) is at least the minmax skyline at t, where (e,e') is an event pair. Since step 5 returned YES, we know that t≦]e', as required. (If multiple dequeue events satisfy the criterion for being scheduled at the same t, break ties arbitrarily). Then schedule each enqueue e at the largest t≦[e such that t≦]e and e is scheduled before e'. One of ordinary skill in the related art can readily verify that this schedule ensures that the actual skyline corresponds to the minmax skyline and hence that the schedule is a valid priority-queue sort.

The time bound follows from known bounds for (sequential) priority queue algorithms and for range minima algorithms. As an example of the former, see T. H. Cormen, C. E. Leiserson, R. L. Rivest, Introduction to Algorithms, McGraw-Hill, New York, N.Y., 1990. As an example of the latter, see Joseph JaJa, "An Introduction to Parallel Algorithms", Addison-Wesley, Reading Mass., 1992.

Figure 4:
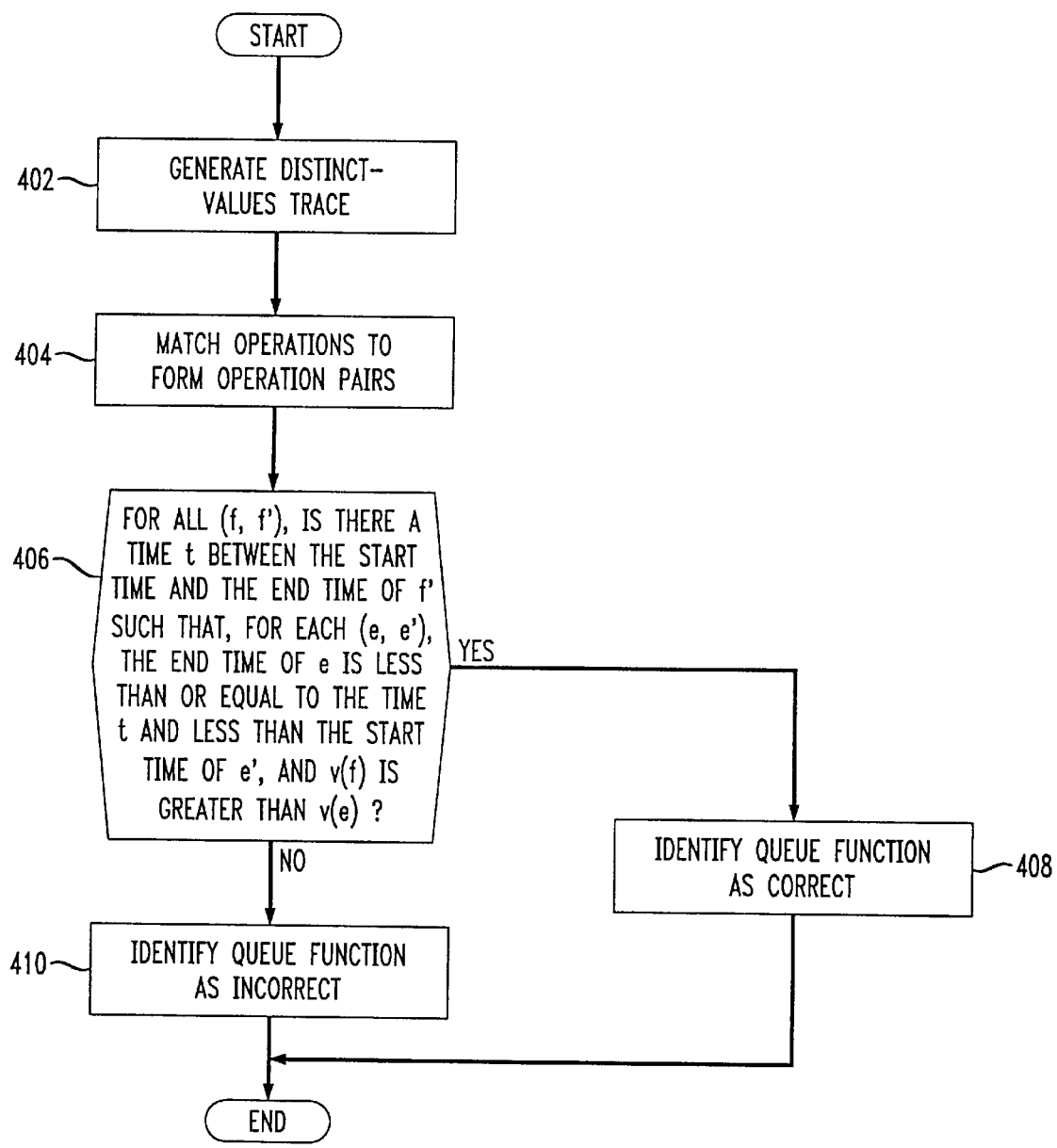
FIG. 4 is a block/flow chart of a system/method for verifying correct function of a linearizable priority queue with respect to a program executed by a plurality of processors according to an embodiment of the present invention.

With respect to a computer processing system that includes a linearizable priority queue and a plurality of processors, wherein the queue supports insert and deletemax operations, FIG. 4 is a block/flow chart of a system/method for verifying correct function of the queue with respect to a program executed by the processors according to an embodiment of the present invention. The system/method of FIG. 4 corresponds to Algorithm B given above.

The system/method includes generating a distinct-values trace of operations on the queue (block 402). The trace includes the operations and an identifier associated with each of the operations, wherein each operation has two timestamps associated therewith respectively corresponding to a start time and an end time of the operation.

The operations are matched to generate corresponding operation pairs (block 404). It is then determined whether, for all corresponding operation pairs including an enqueue operation f and a corresponding dequeue operation f', there exists a time t between the start time and end time of the dequeue operation f' such that, for each operation pair including the enqueue operation e and a corresponding dequeue operation e', an end time of the enqueue operation e is less than or equal to the time t and less than the start time of the dequeue operation e', and a value corresponding to the enqueue operation f is greater than a value corresponding to an enqueue operation e (block 406). If so, then the function of the queue is identified as correct (block 408). Otherwise, the function of the queue is identified as incorrect (block 410).

Alternatively, the system/method of FIG. 4, which is directed to testing a linearizable priority queue supporting insert and deletemax operations, can be readily modified to test a linearizable priority queue supporting insert and deletemin operations. In particular, block 406 is modified as follows. In block 406, the value corresponding to the enqueue operation f is less than (as opposed to greater than) the value corresponding to the enqueue operation e.

Figure 5:
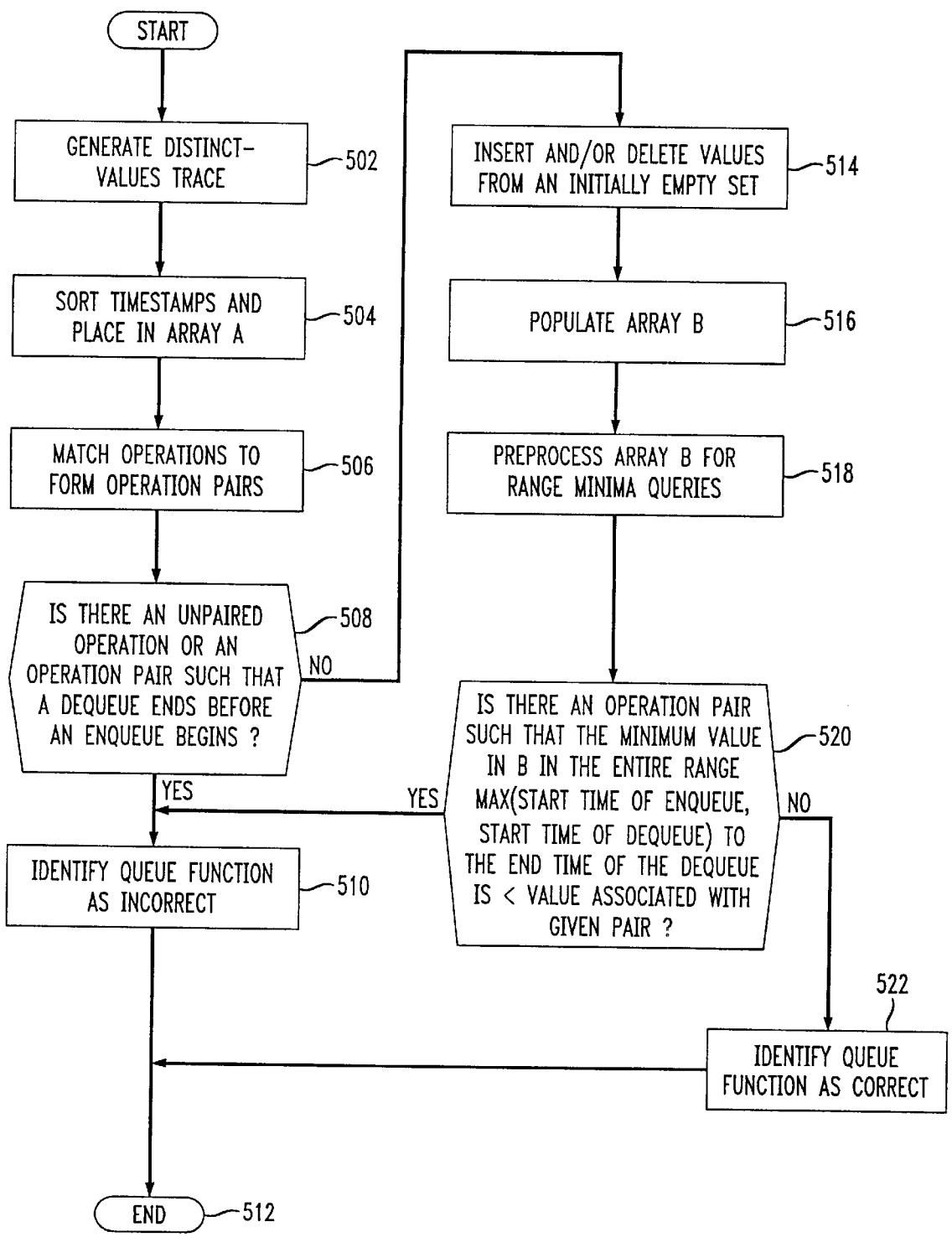
FIG. 5 is a block/flow chart of a system/method for verifying correct function of a linearizable priority queue with respect to a program executed by a plurality of processors according to another embodiment of the present invention.

With respect to a computer processing system that includes a linearizable priority queue and a plurality of processors, wherein the queue supports insert and deletemax operations, FIG. 5 is a block/flow chart of a system/method for verifying correct function of the queue with respect to a program executed by the processors according to an embodiment of the present invention. The system/method of FIG. 5 corresponds to Algorithm B given above.

The system/method includes generating a distinct-values trace of operations on the queue (block 502). The trace includes the operations and an identifier associated with each of the operations, wherein each operation has two timestamps associated therewith respectively corresponding to a start time and an end time of the operation.

The timestamps are sorted in either ascending or descending order and the sorted timestamps are placed in an array A (block 504). The operations are matched to generate corresponding operation pairs (block 506). It is then determined whether there exists an unpaired operation or an operation pair such that a dequeue operation of the pair ends before an enqueue operation of the pair begins (block 508). If so, then the function of the queue is identified as incorrect (block 510), and the system/method is terminated (block 512). Otherwise, the system/method proceeds to block 514.

At block 514, for all i, in ascending order when the sorting performed at block 504 is ascending, or in descending order when the sorting performed at block 504 is descending, and starting with a set being initially empty, a value associated with a given operation pair is inserted into the set when A[i] is equal to an end time of an enqueue operation of the given operation pair that precedes a start time of a dequeue operation of the given operation pair; the value associated with the given operation is deleted from the set when A[i] is equal to the start time of the dequeue of the given operation pair that succeeds the end time of the enqueue operation of the given operation pair.

For each i, an array B[i] is populated with the maximum value in the set upon processing A[i] (block 516). Preferably, but not necessarily, the array B is preprocessed for range minima queries (block 518).

It is determined whether there exists a respective operation pair such that the minimum value in the array B in an entire range max(a start time of an enqueue operation of the respective operation pair, a start time of a dequeue operation of the respective operation pair) to an end time of the dequeue operation of the respective operation pair is greater than the value associated with the given operation pair (block 520). If so, then the system/method returns to block 510 to identify the function of the queue as incorrect. Otherwise, the function of the queue is identified as correct (block 522).

Alternatively, the system/method of FIG. 5, which is directed to testing a linearizable priority queue supporting insert and deletemax operations, can be readily modified to test a linearizable priority queue supporting insert and deletemin operations. In particular, blocks 516, 518, and 520 are modified as follows. In block 516, for each i, the array B[i] is populated with the minimum value (as opposed to the maximum value) in the set upon processing A[i]. In block 518, the array B is preprocessed for range maxima (as opposed to minima) queries. In block 520, it is determined whether there exists a respective operation pair such that the maximum (as opposed to the minimum) value in the array B in an entire range max(a start time of an enqueue operation of the respective operation pair, a start time of a dequeue operation of the respective operation pair) to an end time of the dequeue operation of the respective operation pair is less (as opposed to greater) than the value associated with the given operation pair.

With respect to block 518, any preprocessing methodology may be used to preprocess array B for range minima queries. Preferably a preprocessing algorithm is employed such as that described by Joseph JaJa, in "An Introduction to Parallel Algorithms", Addison-Wesley, Reading Mass., 1992. Alternatively, the following, known preprocessing algorithm may be employed:

1. Populate a binary tree, where the i'th leaf has the value B[i], and the value of each internal node is the minimum of the values of its two children, which can readily be computed by starting at the leaves and working up to the root of the tree.

2. To determine the minimum value, m, in B in a range from B[x] to B[y], x<y:
   (a) Let m be initially the smaller of B[x] and B[y];
   (b) Let z be the internal node in the tree such that $p\_1$, $p\_2, \ldots, p\_k, z, q\_k, \ldots, q\_2, q\_1$ are distinct nodes in the tree with x=p+1, y=q$\_1$, k>=1, $p\_k$ and $q\_k$ are the two children of z, and for i=1, 2, ..., k−1, $p\_i$ is a child of $p\_(i+1)$ and $q\_i$ is a child of $q\_(i+1)$.
   (c) For i=1, 2, ..., k−1 in turn, if $p\_i$ is the left child of $p\_(i+1)$ and the value v of the right child of $p\_i+1$) is less than m, set m to be v.
   (d) For i=1, 2, ..., k−1 in turn, if $q\_i$ is the right child of $q\_(i+1)$ and the value v of the left child of $p\_(i+1)$ is less than m, set m to be v.

Alternatively, when the system/method of FIG. 5 is used to test a linearizable priority queue supporting insert and deletemin operations, the preceding algorithm is modified as follows with respect to step 518 to perform range maxima queries: each occurrence of the term "minimum" in steps 1 and 2 is replaced with "maximum"; the term "smaller" in step 2a is replaced with the term "larger"; and each occurrence of the terms "less than" in steps 2c and 2d are replaced with the terms "greater than".

The testing of sequentially consistent queues according to an embodiment of the present invention will now be described. Let (U, <, π, op) be a distinct-values trace for a possibly buggy non-linearizable FIFO queue. For the popular scenario in which the partial order < is the union of p chains, we present an $O(np^2)$ time algorithm (Algorithm C below) that returns a queue sort of (U, <, π, op) whenever it exists. For the common case of p<<n, this significantly improves upon our $O(n^3)$ time algorithm for arbitrary partial orders as described in "Testing Concurrent Data Structures", J. L. Bruno, P. B. Gibbons, and S. Phillips, Technical report, AT&T Bell Laboratories, Murray Hill, N.J., December 1994. Both algorithms incrementally generate a set of ordering constraints between events that must be respected by any queue sort. Algorithm C improves upon the algorithm described in the above referenced article entitled "Testing Concurrent Data Structures" by maintaining only a sparse set of constraints and avoiding repeated transitive closures.

Let an interchain constraint be a constraint between two events on different chains. In Algorithm C, steps 2–5 construct a graph G representing the relation < and add a sparse set of interchain constraints between enqueue events as implied by other constraints. The key idea is in step 5, where we process the events in G from the leaves, maintaining the invariant that each processed enqueue node w has exactly one outgoing edge per chain reachable from w, such that the edge corresponds to the earliest event on the chain reachable from w. We show that although processing nodes adds new edges, no backtracking is necessary, and moreover the resulting G suffices for a greedy scheduling of G in step 8 that succeeds if we have a valid trace.

Given a distinct-value trace for a (possibly buggy) FIFO queue, where the partial order < is the union of p chains, Algorithm C determines whether there exists a queue sort σ of the trace. Algorithm C includes the following steps:

1. Match up event pairs. If there exists an event that is not in an event pair, return NO.
2. Construct a graph, G, where the nodes of G are the events and there is a directed edge in G from event α to event β only if we have the constraint α<$_o$β. Initialize G to be the p chains of <.
3. Consider each pair of events a', b on the same chain such that a' is a dequeue event, b is an enqueue event, and b is the event after a' on the chain (i.e., a'<b and there is no event α on the chain such that a'<α<b). Let (a, a') be an event pair. If a and b are on different chains, add an interchain edge from a to b, since a'<b implies a<$_o$a'<$_o$b.
4. Consider each pair of dequeue events a', b' on the same chain such that b' is the earliest dequeue event after a' on the chain (i.e., a'<b' and there is no dequeue event c' such that a'<c'<b'). Let (a, a') and (b, b') be event pairs. If a and b are on different chains, add an interchain edge from a to b.
5. Mark all events as unprocessed. We will process G starting with its leaves. We maintain the invariant that each processed enqueue node w has exactly one outgoing edge per chain reachable from w, such that the edge corresponds to the earliest event on the chain reachable from w.

Repeat while there is an unprocessed node in G whose children are all processed:
   (a) Select an unprocessed node w in G whose children are all processed. If w is a dequeue event, mark w as processed and repeat. Otherwise, w is an enqueue event. Let chain i be the chain containing w.
   (b) Let C(w) be the set of children of w on other chains together with the earliest enqueue event after w on chain i. Discard the interchain edges outgoing from w, and replace them with edges to the earliest event at each chain j of a node in C(w) not in chain j.
   (c) For all a such that there is an interchain edge from w to a: Let c' be the latest dequeue event before w on chain i, and let d' be the earliest dequeue event after a on the same chain as a, if they exist. Let (c, c') and (d, d') be event pairs. If d is earlier than c on the same chain, then return NO. Otherwise, if c and d are on different chains, and there is no child x of c that precedes d on the same chain, then add an edge from c to d. If there is a child x of c that succeeds d on the same chain, then discard the edge from c to x.
   (d) Mark w as processed.
6. If G has an unprocessed node, return NO.
7. Let Q be an empty queue (note that this queue is for the purposes of the algorithm and is not the queue under test) and σ be an empty topological sort. If all of the parents of an event e have been placed in the topological sort then e is eligible to be added to the topological sort. Let S be the set of eligible enqueue events, i.e., events b with indegree zero in G.
8. Repeat the following until G is empty:
   (a) If S is nonempty, select and remove from S and G an enqueue event a. Add a to the topological sort σ, and append v(a) to Q. For each child b of a such that b is an enqueue event, check to see if b is now eligible, and if so, add b to S.
   (b) If S is empty, let h be the enqueue event such that v(h) is at the head of Q, and let (h,h') be an event pair. If there is no such h since Q is empty, or h' is not eligible, return NO.
   Otherwise, remove h' from G. add h' to σ, and dequeue v(h) from Q. Check to see if the successor of h' on its chain (if any) is an enqueue event that is now eligible, and if so, add it to S.
9. Identify function of the queue (under test) as correct and return the sort σ.

It is to be appreciated that the above substep of discarding an edge in step 5c of Algorithm B may be omitted. It is to be further appreciated that the above substep of adding an edge in step 5c of algorithm B may be modified such that the edge is added if c and d are on different chains (that is, without regard as to whether there is a child x of c that precedes d on the same chain). Given the teachings of the invention provided herein, one of ordinary skill in the related art will be able to contemplate these and similar implementations of the elements of the invention.

It is also to be appreciated that the queue referred to in step 7 of algorithm C is preferably implemented as a sequential queue. However, it is to be appreciated that the queue may be implemented in other types of queues other than a sequential queue.

Let $(U, <, \pi, op)$ be a distinct-values trace with n events such that $<$ is the union of p chains. Algorithm C runs in $O(np^2)$ time and returns a queue sort of $(U, <, \pi, op)$ if one exists. A proof for the preceding statement follows. The following four observations can be proved by a simple inductive argument, readily understood by one of ordinary skill in the related art: (1) all added edges must be satisfied by all queue sorts of $(U, <, \pi, op)$; (2) all discarded edges are implied by the transitive closure of the remaining edges; (3) the order of events added to σ in step 8 is a valid topological sort of G; and (4) if the algorithm returns NO in step 5(c) or step 8, then there is a cycle of dependencies, and hence the trace is invalid.

Because of the order of processing the events in G, any edge added in step 5(c) is outgoing from an unprocessed node. To see this, consider an edge from c to d added during the processing of w. Let x be the enqueue event after c' on the same chain as w. At step 3, we add an edge from c to x, so that there is a directed path from c to w in G. Since w is being processed, its ancestor c has not yet been processed.

At the time of processing a node, only those nodes that have been already processed can be reached and, hence, the set of nodes reachable by a processed node is unchanged by further processing of nodes. It follows that step 5(b) suffices to maintain the invariant of step 5. Moreover, for each processed node, we have applied step 5(c) to each of its outgoing interchain edges (i.e., no backtracking was necessary).

Next, it will be shown that if we are unable to schedule the next operation in step 8(b), then $(U, <, \pi, op)$ is not a valid trace. Since S is empty, we have that all enqueue events have at least one incoming edge (since none are eligible). If Q is empty, then all dequeue have an (implicit) incoming edge from their respective enqueues, and hence we have a cycle and hence an invalid trace. If Q is not empty, then suppose h' in step 8(b) is not eligible. Since we only add interchain edges between enqueue events, h' is not currently the head of its chain j. There are two cases to consider:

1. There is a dequeue event, a', earlier than h' on chain j that is still in G (i.e., it has not yet been added to σ). Then, in step 4 of the algorithm, edges are added to G that form a path from a to h. Since a' has not been added to σ, either a is still in G or v(a) is in Q. By observation 3 above, v(a) must be ahead of v(h) in Q, which is a contradiction. Hence the trace is invalid.

2. The events in chain j that occur earlier than h' and that are still in G are all enqueue events. Let a be the enqueue event that is the current head of chain j. If the current heads of all chains are ineligible events, we have a cycle and the trace is invalid. Because no enqueue events are eligible, there must be a path in the current G from an eligible dequeue event, c', to a. By the invariant of step 5, there must be an interchain edge from b to a, where b is the earliest enqueue event after c' on the same chain. When the edge from b to a was processed in step 5, the edge from c to h was added. Therefore, by observation 3 above, v(c) was enqueued in Q before v(h), and has not been dequeued by the algorithm. Thus v(h) cannot be at the head of Q, which is a contradiction. Thus the trace is invalid.

As would be known to one of ordinary skill in the related art, in an O(n) time preprocessing of each chain, we can label each event with its chain, its rank within its chain, and the index of its next and previous dequeue and enqueue events on its chain. All but step 5(b) can be done in O(np) time, since we maintain O(p) edges per node. Step 5(b) requires $O(p^2)$ time per node, for a total time bound of $O(np^2)$.

In the course of Algorithm C, we construct a partial order on the enqueue events, to be used in step 8 of the algorithm, using O(np) edges in all. Note that there are partial orders that can be constructed starting with p chains such that, for any p and any $n \geq p^2$, the number of edges is $\Theta(pn)$, and removing any edge alters the transitive closure. For example, consider p chains of n/p events and the partial order in which for all i, j and k, $1 \leq i \leq p$, $1 \leq j \leq n/p$, $0 \leq k \leq \min(p-i, n/p-j-1)$, there is an edge from the jth event in the ith chain to the (j+k+1)th event in the (i+k)th chain. Since each edge increases the event number by exactly one more than it increases the chain number, no single edge can start and end at the same events as a path of more than one edge, so removing any of the $\Theta(pn)$ edges alters the transitive closure.

Figure 6A:
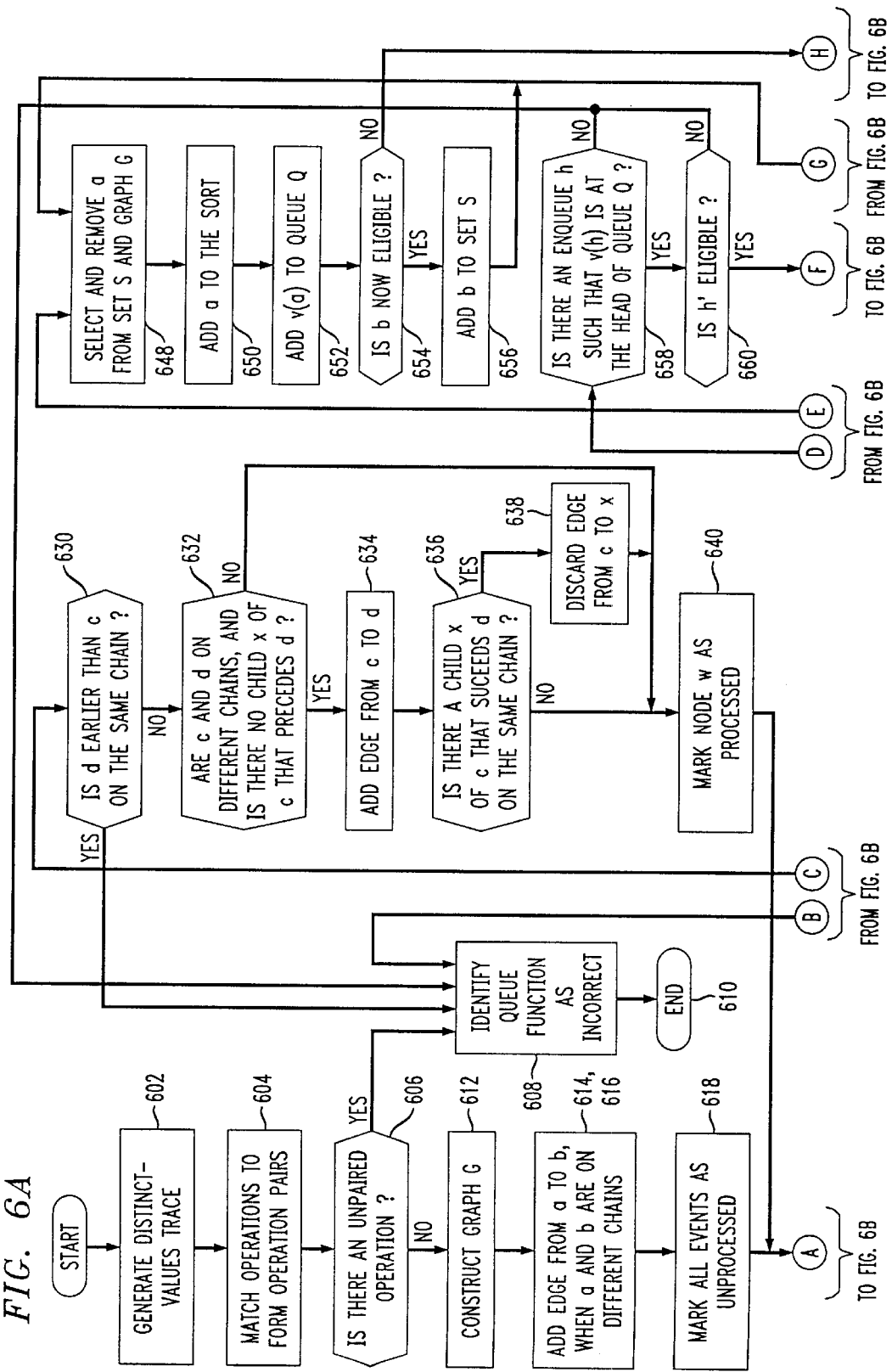

With respect to a computer processing system that includes a non-linearizable queue and a plurality of processors, FIG. 6 is a block/flow chart of a system/method for verifying correct function of the queue with respect to a program executed by the processors according to an embodiment of the present invention. The system/method of FIG. 6 corresponds to Algorithm C given above.

The system/method includes generating a distinct-values trace of operations on the queue (block 602). The trace includes the operations and an identifier associated with each of the operations.

The operations are matched to generate corresponding operation pairs, based on the identifiers (block 604). It is then determined whether there exists an unpaired operation (block 606). If so, then the function of the queue is identified as incorrect (block 608), and the system/method is terminated (block 610). Otherwise, the system/method proceeds to block 612.

At block 612, a graph G is constructed. The graph G has nodes corresponding to the operations, and directed edges from a node α to a node β when the node α is an immediate predecessor of the node β with respect to a given chain.

Given each pair of operations a', b on the same chain such that a' is a dequeue operation, b is an enqueue operation, b is the operation after a' on the chain (i.e., a'<b and there is no operation α on the chain such that a'<α<b), and (a, a') are an operation pair including an enqueue operation a and the dequeue operation a', an interchain edge from a to b is added when a and b are on different chains (block 614). Given each pair of dequeue operations a', b' on the same chain such that b' is the earliest dequeue operation after a' on the chain (i.e., a'<b' and there is no dequeue operation c' such that a'<c'<b'), and (a, a') and (b, b') are operation pairs, an interchain edge from a to b is added when a and b are on different chains (block 616).

All events as marked as unprocessed (block 618). We will process the graph G starting with its leaves. We maintain the invariant that each processed enqueue node w has exactly one outgoing edge per chain reachable from w, such that the edge corresponds to the earliest event on the chain reachable from w. It is then determined whether there is an unprocessed node in the graph G whose children are all processed (block 620). If so, then the system/method proceeds to block 622. Otherwise, the system/method proceeds to block 644.

At block 622, an unprocessed node w in the graph G whose children are all processed is selected. It is then determined whether w is a dequeue operation (block 624). If so, w is marked as processed (block 626) and the system/method returns to block 622. Otherwise, w is an enqueue event, and the system/method proceeds to block 628.

At block 628, given that chain i is the chain containing w, C(w) is the set of children of w on other chains together with the earliest enqueue operation after w on chain i, the interchain edges outgoing from w are discarded and replaced with edges to the earliest operation at each chain j of a node in C(w) not in chain j.

For all a such that there is an interchain edge from w to a, and given that c' is the latest dequeue event before w on chain i, d' is the earliest dequeue operation after a on the same chain as a, if c' and d' exist, and (c, c') and (d, d') are operation pairs, it is determined whether d is earlier than c on the same chain (block 630). If so, then the system/method returns to block 608. Otherwise, the system/method proceeds to block 632.

At block 632, it is determined whether c and d are on different chains, and there is no child x of c that precedes d on the same chain. If so, then an edge is added from c to d (block 634), and the system/method proceeds to block 636. Otherwise, the system/method proceeds to block 640. At block 636, it is determined whether there is a child x of c that succeeds d on the same chain. If so, then the edge from c to x is discarded (block 638). Otherwise, the system/method proceeds to block 640. At block 640, the node w is marked as processed, and a return is made to block 620.

At block 644, it is determined whether the graph G has an unprocessed node. If so, then the system/method returns to block 608. Otherwise, the system/method proceeds to block 646.

There is given an empty queue Q (note that this queue is for the purposes of the system/method and is not the queue under test), an empty topological sort σ, and a set S of eligible enqueue operations (i.e., events b with indegree zero in the graph G), wherein an operation e is eligible to be added to the sort when all parents of the operation e are in the sort. It is determined whether the set S is nonempty (block 646). If not, then the system/method proceeds to block 658. Otherwise, select and remove from the set S and the graph G an enqueue event a (block 648). The node a is added to the topological sort σ (block 650). A value corresponding to the enqueue operation a is added to the queue Q (block 652). For each child b of a such that b is an enqueue event, it is determined whether b is now eligible (block 654). If so, then b is added to the set S (block 656), and the system/method returns to block 648. Otherwise, the system/method proceeds to block 666.

At block 658, it is determined whether there exists an enqueue operation h in an operation pair that also includes a dequeue operation h' such that v(h) is at the head of the queue Q. If not, then the system/method returns to block 608. Otherwise, it is determined whether h' is eligible (block 660). If not, then the system/method returns to block 608. Otherwise, h' is removed from the graph G, h' is added to the sort σ, and v(h) is dequeued from the queue Q (block 662). It is then determined whether the successor of h' on its chain (if any) is an enqueue event that is now eligible (block 664).

If so, the successor of h' is added to the set S (block 665), and the system/method returns to block 648. Otherwise, the system/method proceeds to block 666. At block 666, it is determined whether the graph G is empty. If not, a return is made to block 646. Otherwise, the function of the queue is identified as correct, and the topological sort σ is returned (block 668), and the system/method is terminated (block 670).

Figure 7:
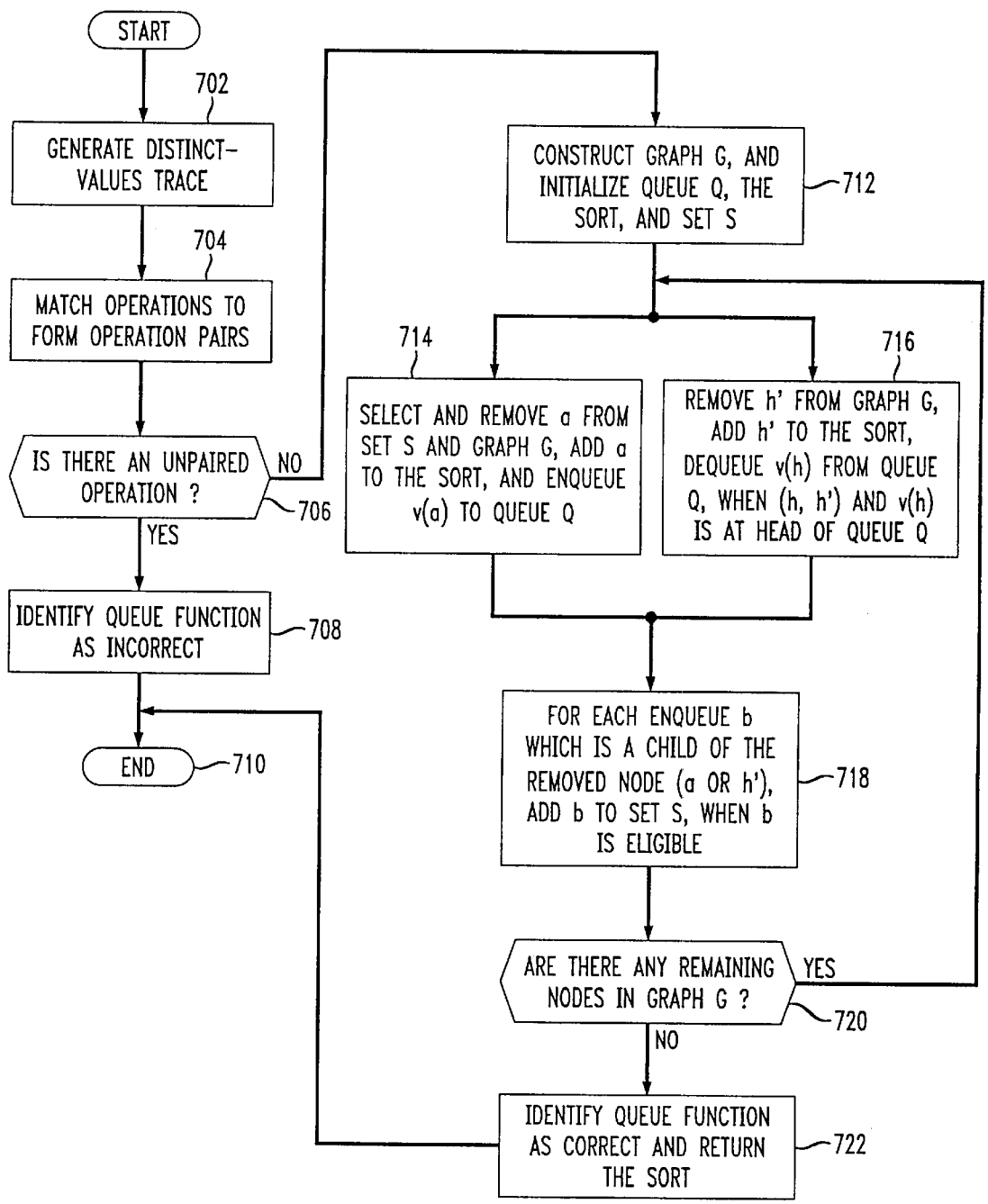
FIG. 7 is a block/flow chart of a system/method for verifying correct function of a non-linearizable queue with respect to a program executed by a plurality of processors according to another embodiment of the present invention.

With respect to a computer processing system that includes a non-linearizable queue and a plurality of processors, FIG. 7 is a block/flow chart of a system/method for verifying correct function of the queue with respect to a program executed by the processors according to an embodiment of the present invention. The system/method of FIG. 7 corresponds to Algorithm C given above.

The system/method includes generating a distinct-values trace of operations on the queue (block 702). The trace includes the operations and an identifier associated with each of the operations.

The operations are matched to generate corresponding operation pairs, based on the identifiers (block 704). It is then determined whether there exists an unpaired operation (block 706). If so, then the function of the queue is identified as incorrect (block 708), and the system/method is terminated (block 710). Otherwise, the system/method proceeds to block 712. At block 712, a graph G is constructed. The graph G has nodes corresponding to the operations, and directed edges from a node α to a node β when the node α is an immediate predecessor of the node β with respect to a given chain, or the nodes α and β correspond to enqueue operations on different chains and the node α must precede the node β in a queue sort.

Given an empty queue Q (note that this queue is for the purposes of the system/method and is not the queue under test), an empty topological sort σ, and a set S of eligible enqueue operations, wherein an operation e is eligible to be added to the sort when all parents of the operation e are in the sort, either block 714 or block 716 may be performed for a node remaining in the graph G, upon which the system/method proceeds to block 718.

At block 714, an enqueue operation a from the set S and a node corresponding to the operation a from the graph G is selected and removed, an operation a is added to the sort, and a value corresponding to the operation a is enqueued to the queue Q.

At block 716, a node corresponding to a dequeue operation h' is removed from the graph G, the dequeue operation h' is added to the sort, and a value corresponding to an enqueue operation h is dequeued from the queue Q, when the enqueue operation h and the dequeue operation h' are comprised in an operation pair and a value corresponding to the operation h is at a head of the queue.

At block 718, for each node b which is a child of the removed node (the node corresponding to operation a when block 714 is performed, or the node corresponding to operation h' when block 716 is performed) such that the node b is an enqueue operation, an operation corresponding to the node b is added to the set S, when the node b is eligible. It is then determined whether there exists any remaining nodes in the graph G (block 720). If so, then the system/method returns to block 714 or to block 716 (again, either block may be taken). Otherwise, the system/method proceeds to block 722. At block 722, the function of the queue is identified as correct and the topological sort σ is returned. It is to be appreciated that in the case when either block 714 or block 716 cannot be performed, the function of the queue is identified as incorrect (i.e., block 708).

The present invention provides fast algorithms for testing the correctness of parallel queues by post-mortem analysis of traces. The focus has been on black-box testing procedures, with low over-head, in which each data object is tested individually.

A description of some of the many extensions that may be implemented in accordance with the present invention will now be given. It is to be appreciated that such extensions may be readily implemented by one of ordinary skill in the related art.

First, the algorithms presented in this paper can be extended to report more than just a YES/NO answer. For example, when the trace is invalid, the algorithms can be readily extended to report an offending event pair, or perhaps all uncovered offending pairs.

Second, one can consider testing of partial traces, in order to provide earlier feedback. For example, the algorithms for linearizable data objects can be readily extended to test partial traces up through a given timestamp.

Third, one could consider parallel algorithms for testing parallel executions. Algorithm A, for example, can be implemented on a QRQW PRAM in O(n) work and O(log n) time, with high probability, using standard techniques. A QRQW PRAM is described by P. B. Gibbons, Y. Matias, V. Ramachandran, in "The Queue-Read Queue-Write PRAM Model: Accounting for Contention in Parallel Algorithms", SIAM Journal on Computing, 28(2):733–769, 1998.

Fourth, invasive procedures can be used that either modify the values inserted into the data structure or modify the data structure implementation itself to assist in testing. The former is described, for example, by P. B. Gibbons and E. Korach, in "Testing Shared Memories", SIAM Journal on Computing, 26(4):1208–1244, 1997. The latter is described, for example, by: G. F. Sullivan and G. M. Masson, in "Using Certification Trails to Achieve Software Fault Tolerance", Proc. $20^{th}$ IEEE Fault-Tolerant Computing Symp., pp. 423–31, 1990; G. F. Sullivan and G. M. Masson, "Certification Trails for Data Structures", Proc. $21^{st}$ IEEE Fault-Tolerant Computing Symp., pp. 240–47, 1991; J. Bright and G. Sullivan, "Checking Mergeable Priority Queues", Proc. $24^{th}$ IEEE Fault-Tolerant Computing Symp., pp. 144–53, June 1994; and P. B. Gibbons and E. Korach, "Testing Shared Memories", SIAM Journal on Computing, 26(4):1208–1244, 1997. There is a clear benefit to doing this in our case: the NP-hardness results described by J. L. Bruno, P. B. Gibbons, and S. Phillips, in "Testing Concurrent Data Structures", Technical report, AT&T Bell Laboratories, Murray Hill, N.J., December 1994, for arbitrary values can be overcome by tagging each value inserted into the data structure with a unique index, as discussed above, so that the methods of the present invention for distinct-values traces can be used.

Fifth, there may be scenarios where traces contain events on multiple objects, and we seek a single topological sort that preserves the semantics of each object. As observed by J. L. Bruno, P. B. Gibbons, and S. Phillips, in "Testing Concurrent Data Structures", Technical report, AT&T Bell Laboratories, Murray Hill, N.J., December 1994, the NP-completeness results presented herein for individual objects clearly imply NP-completeness results for collective objects. Each linear/O(n log n)/polynomial time algorithm for a single linearizable data object implies a linear/O(n log n)/polynomial time algorithm, respectively, for traces inter-mixing any number of linearizable data objects, since linearizability is a local property (as described by M. P. Herlihy and J. M. Wing, "Linearizability: A Correctness Condition for Concurrent Objects", ACM Trans. on Programming Languages and Systems, 12(3):463–492, 1990).

Finally, one might rely more on proofs of correctness. For example, one of ordinary skill in the related art could prove that a shared memory algorithm, maybe even an implementation, is correct based on the assumption that the shared memory is sequentially consistent or linearizable. Existing proofs that a memory system always preserves sequential consistency or linearizability assume fault-free hardware (e.g., as described by P. B. Gibbons, M. Merritt, and K. Gharachorloo, in "Proving Sequential Consistency of High-performance Shared Memories", Proc. $3^{rd}$ ACM Symp. on Parallel Algorithms and Architectures, pages 292–303, July 1991), and even testing whether the memory system preserved sequential consistency or linearizability for a single program run is NP-complete (as described by P. B. Gibbons and E. Korach, in "Testing Shared Memories", SIAM Journal on Computing, 26(4):1208–1244, 1997).

Although the illustrative embodiments have been described herein with reference to the accompanying drawings, it is to be understood that the present system and method is not limited to those precise embodiments, and that various other changes and modifications may be affected therein by one skilled in the art without departing from the scope or spirit of the invention. All such changes and modifications are intended to be included within the scope of the invention as defined by the appended claims.

What is claimed is:

1. In a computer processing system comprising a linearizable queue and a plurality of processors, a method for verifying correct function of the queue with respect to a program executed by the processors, given a trace comprising events on the queue and an identifier associated with each of the events, wherein each event is associated with two timestamps respectively corresponding to a start time and an end time of the event, the method comprising the steps of:

matching the events to generate corresponding event pairs, based on the identifiers; and identifying the function of the queue as correct, when, for any event pair comprising an enqueue event e and a corresponding dequeue event e', there does not exist another event pair comprising an enqueue event d and a corresponding dequeue event d' such that an end time of the enqueue event e precedes a start time of the enqueue event d and an end of the dequeue event d' precedes a start time of the dequeue event e'.

2. The method according to claim 1, further comprising the step of identifying the other event pair comprising the enqueue event d and the corresponding dequeue event d' as an offending event pair, when the function of the queue is not identified as correct.

3. The method according to claim 1, wherein the trace is a partial trace comprising some, but not all, of the events on the queue with respect to the program executed by the processors, and said method is performed with respect to only the events comprised in the partial trace.

4. The method according to claim 1, wherein the trace is one of a distinct-values trace and a non-distinct-values trace.

5. The method according to claim 1, wherein said method is performed substantially in parallel by the plurality of processors comprised in the computer processing system, an other plurality of processors comprised in an other computer processing system, or a combination thereof.

6. In a computer processing system comprising a linearizable queue and a plurality of processors, a method for verifying correct function of the queue with respect to a program executed by the processors, given a trace comprising events on the queue and an identifier associated with each of the events, wherein each event is associated with two timestamps respectively corresponding to a start time and an end time of the event, the method comprising the steps of:

matching the events to generate corresponding event pairs, based on the identifiers; and for all event pairs comprising an enqueue event e and a corresponding dequeue event e', identifying other event pairs comprising an enqueue event d and a corresponding dequeue event d' such that an end of the dequeue event d' precedes a start time of the dequeue event e';

determining a maximum start time of the enqueue event d from among all the identified, other event pairs; and identifying the function of the queue as correct, when the end time of the enqueue event e is not less than the maximum start time.

7. The method according to claim 6, further comprising the step of identifying the other event pair comprising the enqueue event d and the corresponding dequeue event d' as an offending event pair, when the function of the queue is not identified as correct.

8. The method according to claim 6, wherein the trace is a partial trace comprising some, but not all, of the events on the queue with respect to the program executed by the processors, and said method is performed with respect to only the events comprised in the partial trace.

9. The method according to claim 6, wherein the trace is one of a distinct-values trace and a non-distinct-values trace.

10. In a computer processing system comprising a linearizable queue and a plurality of processors, a method for verifying correct function of the queue with respect to a program executed by the processors, given a trace comprising events on the queue and an identifier associated with each of the events, wherein each event is associated with two timestamps respectively corresponding to a start time and an end time of the event, the method comprising the steps of:

sorting the timestamps in one of ascending and descending order and placing the timestamps in an array A;

matching the events to generate corresponding event pairs, based on the identifiers;

populating each element of an array B, such that B[i], the ith element of array B, is equal to a start time of an enqueue event of a given event pair when A[i], the ith element of array A, is equal to an end time of a dequeue event of the given event pair, and such that B[i] is equal to zero when A[i] is not equal to the end time of the dequeue event of the given event pair;

populating each element of an array C such that C[i], the ith element of array C, is equal to a maximum value corresponding to all values in the array B from one to i when said sorting is ascending, and from i to an end value in the array B when said sorting is descending; and identifying the function of the queue as correct, when there does not exist i such that A[i] is equal to a start time of a dequeue event of a respective event pair and an end time of an enqueue event of the respective event pair is less than C[i].

11. The method according to claim 10, further comprising the step of, upon performing said matching step, identifying the function of the queue as incorrect when there exists one of an unpaired event and an event pair such that a dequeue event of the pair ends before an enqueue event of the pair begins.

12. The method according to claim 10, further comprising the step of identifying the function of the queue as incorrect, when there exists i such that A[i] is equal to a start time of the dequeue event of the respective event pair and the end time of the enqueue event of the respective event pair is less than C[i].

13. The method according to claim 11, further comprising the step of identifying the unpaired event, when there exists the unpaired event.

14. The method according to claim 11, further comprising the step of identifying the event pair, when the event pair exists such that the dequeue event of the pair ends before the enqueue event of the pair begins.

15. The method according to claim 10, wherein the trace is a partial trace comprising some, but not all, of the events on the queue with respect to the program executed by the processors, and said method is performed with respect to only the events comprised in the partial trace.

16. The method according to claim 10, wherein the trace is one of a distinct-values trace and a non-distinct-values trace.

17. In a computer processing system comprising a linearizable priority queue and a plurality of processors, wherein the queue supports insert and one of deletemax and deletemin events, a method for verifying correct function of the queue with respect to a program executed by the processors, given a trace comprising the events on the queue and an identifier associated with each of the events, wherein each event is associated with two timestamps respectively corresponding to a start time and an end time of the event, the method comprising the steps of:

matching the events to generate corresponding event pairs, based on the identifiers; and identifying the function of the queue as correct, if, for all corresponding event pairs comprising an enqueue event f and a corresponding dequeue event f, there exists a time t between the start time and end time of the dequeue event f such that, for each event pair comprising an enqueue event e and a corresponding dequeue event e', an end time of the enqueue event e is one of less than and equal to the time t and less than the start time of the dequeue event e', and a value corresponding to the enqueue event f is one of greater than, when the queue supports deletemax events, and less than, when the queue supports deletemin events, a value corresponding to an enqueue event e.

18. The method according to claim 17, wherein the trace is a partial trace comprising some, but not all, of the events on the queue with respect to the program executed by the processors, and said method is performed with respect to only the events comprised in the partial trace.

19. The method according to claim 17, wherein the trace is one of a distinct-values trace and a non-distinct-values trace.

20. The method according to claim 17, wherein said identifying step comprises the steps of:

computing a minmax skyline with respect to the timestamps of the events; and for all event pairs, determining whether the time t exists such that the value corresponding to the enqueue event f is greater than the skyline corresponding to the time t.

21. The method according to claim 17, further comprising the step of, upon performing said matching step, identifying the function of the queue as incorrect when there exists one of an unpaired event and an event pair such that a dequeue event of the pair ends before an enqueue event of the pair begins.

22. The method according to claim 21, further comprising the step of identifying the unpaired event as offending when the unpaired event exists.

23. The method according to claim 21, further comprising the step of identifying as offending the event pair comprising the dequeue event that ends before the enqueue event of the pair begins, when the event pair exists.

24. The method according to claim 17, further comprising the step of identifying the function of the queue as incorrect, if, for all corresponding event pairs comprising an enqueue event f and a corresponding dequeue event f', there does not exist a time t between the start time and end time of the dequeue event f' such that, for each event pair comprising the enqueue event e and a corresponding dequeue event e', an end time of the enqueue event e is one of less than and equal to the time t and less than the start time of the dequeue event e', and a value corresponding to the enqueue event f is one of greater than, when the queue supports deletemax events, and less than, when the queue supports deletemin events, a value corresponding to an enqueue event e.

25. The method according to claim 24, further comprising the step of identifying as offending the event pair comprising the enqueue event f and the dequeue event f', when the function of the queue is identified as incorrect.

26. In a computer processing system comprising a linearizable priority queue and a plurality of processors, wherein the queue supports insert and one of deletemax and deletemin events, a method for verifying correct function of the queue with respect to a program executed by the processors, given a trace comprising the events on the queue and an identifier associated with each of the events, wherein each event is associated with two timestamps respectively corresponding to a start time and an end time of the event, the method comprising the steps of:

sorting the timestamps in one of ascending and descending order and placing the timestamps in an array A;

matching the events to generate corresponding event pairs, based on the identifiers;

for all I in the array A where A[i] is the ith element in the array, in ascending order when said sorting is ascending, in descending order when said sorting is descending, starting with a set being initially empty, inserting a value associated with a given event pair into the set when A[i] is equal to an end time of an enqueue event of the given event pair that precedes a start time of a dequeue event of the given event pair, and deleting the value associated with the given event pair from the set when A[i] is equal to the start time of the dequeue of the given event pair that succeeds the end time of the enqueue event of the given event pair;

for each i in an array B where B[i] is the ith element in array B, populating each element B[i] with one of, a maximum value when the queue supports deletemax operations, and a minimum value when the queue supports deletemin operations, in the set upon processing A[i]; and identifying the function of the queue as correct, when there does not exist a respective event pair such that one of, a minimum value when the queue supports deletemax events, and a maximum value when the queue supports deletemin events, in the array B in an entire range max(a start time of an enqueue event of the respective event pair, a start time of a dequeue event of the respective event pair) to an end time of the dequeue event of the respective event pair is one of, greater than when the queue supports deletemax event, and less than when the queue supports deletemin events, the value associated with the given event pair.

27. The method according to claim 26, further comprising the step of, upon performing said matching step, identifying the function of the queue as incorrect when there exists one of an unpaired event and an event pair such that a dequeue event of the pair ends before an enqueue event of the pair begins.

28. The method according to claim 26, further comprising the step of preprocessing the array B for range minima queries, before performing said identifying step.

29. The method according to claim 26, further comprising the step of identifying the function of the queue as incorrect, when there exists the respective event pair such that the minimum value in the array B in the entire range max(the start time of the enqueue event of the respective event pair, the start time of the dequeue event of the respective event pair) to the end time of the dequeue event of the respective event pair is greater than the value associated with the given event pair.

30. The method according to claim 29, further comprising the step of identifying the respective event pair as offending when the function of the queue is identified as incorrect.

31. The method according to claim 26, wherein the trace is a partial trace comprising some, but not all, of the events on the queue with respect to the program executed by the processors, and said method is performed with respect to only the events comprised in the partial trace.

32. The method according to claim 26, wherein the trace is one of a distinct-values trace and a non-distinct-values trace.

33. In a computer processing system comprising a non-linearizable queue and a plurality of processors, a method for verifying correct function of the queue with respect to a program executed by the processors, given a trace comprising events on the queue, a chain of events for each processor, and an identifier associated with each of the events, the method comprising the steps of:

matching the events to generate corresponding event pairs, based on the identifiers;

constructing a graph G having nodes corresponding to the events, and directed edges from a node $\alpha$ to a node $\beta$ when one of the node $\alpha$ is an immediate predecessor of the node $\beta$ with respect to a given chain, and the nodes $\alpha$ and $\beta$ correspond to enqueue events on different chains and the node $\alpha$ must precede the node $\beta$ in a queue sort; and for each node remaining in the graph G, given an empty queue Q, an empty topological sort $\sigma$, and a set S of eligible enqueue events, wherein an event e is eligible to be added to the sort when all parents of the event e are in the sort, one of:

selecting and removing an enqueue event a from the set S and a node corresponding to the event a from the graph G, adding an event a to the sort, and enqueuing a value corresponding to the event a to the queue Q, and removing a node corresponding to a dequeue event h' from the graph G, adding the dequeue event h' to the sort, and dequeuing a value corresponding to an enqueue event h from the queue Q, when the enqueue event h and the dequeue event h' are comprised in an event pair and a value corresponding to the event h is at a head of the queue;

for each node b which is a child of the removed node such that the node b is an enqueue event, adding an event corresponding to the node b to the set S, when the node b is eligible; and returning the sort.

34. The method according to claim 33, further comprising the step of, upon performing said matching step, identifying the function of the queue as incorrect, when there exists an unpaired event.

35. The method according to claim 34, further comprising the step of identifying the unpaired event as offending when the unpaired event exists.

36. The method according to claim 33, further comprising the step of identifying the function of the queue as incorrect, when the set S is empty, there exists the enqueue event h such that the value corresponding to the event h is at the head of the queue Q, the enqueue event h and the dequeue event h' are comprised in an event pair, and the dequeue event h' is not eligible.

37. The method according to claim 33, further comprising the step of identifying the function of the queue as incorrect, when the set S and the queue Q are empty.

38. The method according to claim 33, wherein the trace is a partial trace comprising some, but not all, of the events on the queue with respect to the program executed by the processors, and said method is performed with respect to only the events comprised in the partial trace.

39. The method according to claim 33, wherein the trace is one of a distinct-values trace and a non-distinct-values trace.

40. The method according to claim 33, further comprising the step of, upon constructing the graph G, for a given node w on a first chain having edges to a plurality of nodes on a second chain, removing at least some of the edges other than an edge corresponding to a first node of the plurality of nodes.

* * * * *